United States Patent
Tseng et al.

(10) Patent No.: US 9,256,355 B1
(45) Date of Patent: Feb. 9, 2016

(54) ACCELERATED PANNING USER INTERFACE INTERACTION

(71) Applicant: Google Inc., Mountain View, CA (US)

(72) Inventors: Erick Tseng, San Francisco, CA (US); Amith Yamasani, San Jose, CA (US); Michael A. Cleron, Menlo Park, CA (US); Paul A. Dickinson, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/659,408

(22) Filed: Mar. 16, 2015

Related U.S. Application Data

(63) Continuation of application No. 14/076,841, filed on Nov. 11, 2013, now Pat. No. 8,984,436, which is a continuation of application No. 13/613,766, filed on Sep. 13, 2012, now Pat. No. 8,584,035, which is a continuation of application No. 12/473,927, filed on May 28, 2009, now Pat. No. 8,291,341.

(60) Provisional application No. 61/056,823, filed on May 28, 2008.

(51) Int. Cl.
*G06F 3/0485* (2013.01)
*G06F 3/0482* (2013.01)

(52) U.S. Cl.
CPC ............ *G06F 3/0485* (2013.01); *G06F 3/0482* (2013.01)

(58) Field of Classification Search
CPC ............ G06F 3/00; G06F 3/01; G06F 3/041; G06F 3/048; G06F 3/016; G06F 1/1626; G06F 3/0488; G06F 3/0481; G06F 3/0485; G06F 3/04883; G06F 3/04855; G06F 9/44543; G06F 9/4443
See application file for complete search history.

(56) References Cited

U.S. PATENT DOCUMENTS

| | | | |
|---|---|---|---|
| 6,400,376 B1 | 6/2002 | Singh et al. | |
| 7,075,513 B2 | 7/2006 | Silfverberg et al. | |
| 7,274,377 B2 | 9/2007 | Ivashin | |
| 7,308,653 B2 | 12/2007 | Lin-Hendel | |
| 7,576,756 B1 | 8/2009 | Good et al. | |
| 7,681,142 B2 | 3/2010 | Jarrett et al. | |
| 7,814,439 B2 | 10/2010 | Fitzmaurice et al. | |
| 7,847,792 B2 | 12/2010 | Ketterer et al. | |
| 7,952,596 B2 * | 5/2011 | Thorn | 345/660 |
| 2002/0196238 A1 | 12/2002 | Tsukada et al. | |
| 2004/0174398 A1 | 9/2004 | Luke et al. | |
| 2007/0018967 A1 | 1/2007 | Wang et al. | |
| 2008/0027637 A1 | 1/2008 | Sakano | |
| 2008/0189650 A1 | 8/2008 | Scott et al. | |
| 2008/0222558 A1 | 9/2008 | Cho | |
| 2009/0119614 A1 | 5/2009 | Tienvieri et al. | |
| 2009/0198767 A1 | 8/2009 | Jakobson et al. | |
| 2009/0252311 A1 | 10/2009 | Kuiken | |
| 2012/0329558 A1 * | 12/2012 | Haigh-Hutchinson | 463/32 |

* cited by examiner

*Primary Examiner* — Xiomar L Bautista
(74) *Attorney, Agent, or Firm* — Fish & Richardson P.C.

(57) ABSTRACT

A computer-implemented user interface method includes displaying on a touch screen a portion of a large scale graphical space that is at least multiples larger than the device display, receiving from a user of the device an input to pan within the graphical space, automatically generating a pop up graphical panning control in response to receiving the user input, and receiving a user input to the panning control and providing panning in the graphical space, wherein movement of the panning control in a single selection is able to pan the display across a substantial portion of the large scale graphical space.

20 Claims, 16 Drawing Sheets

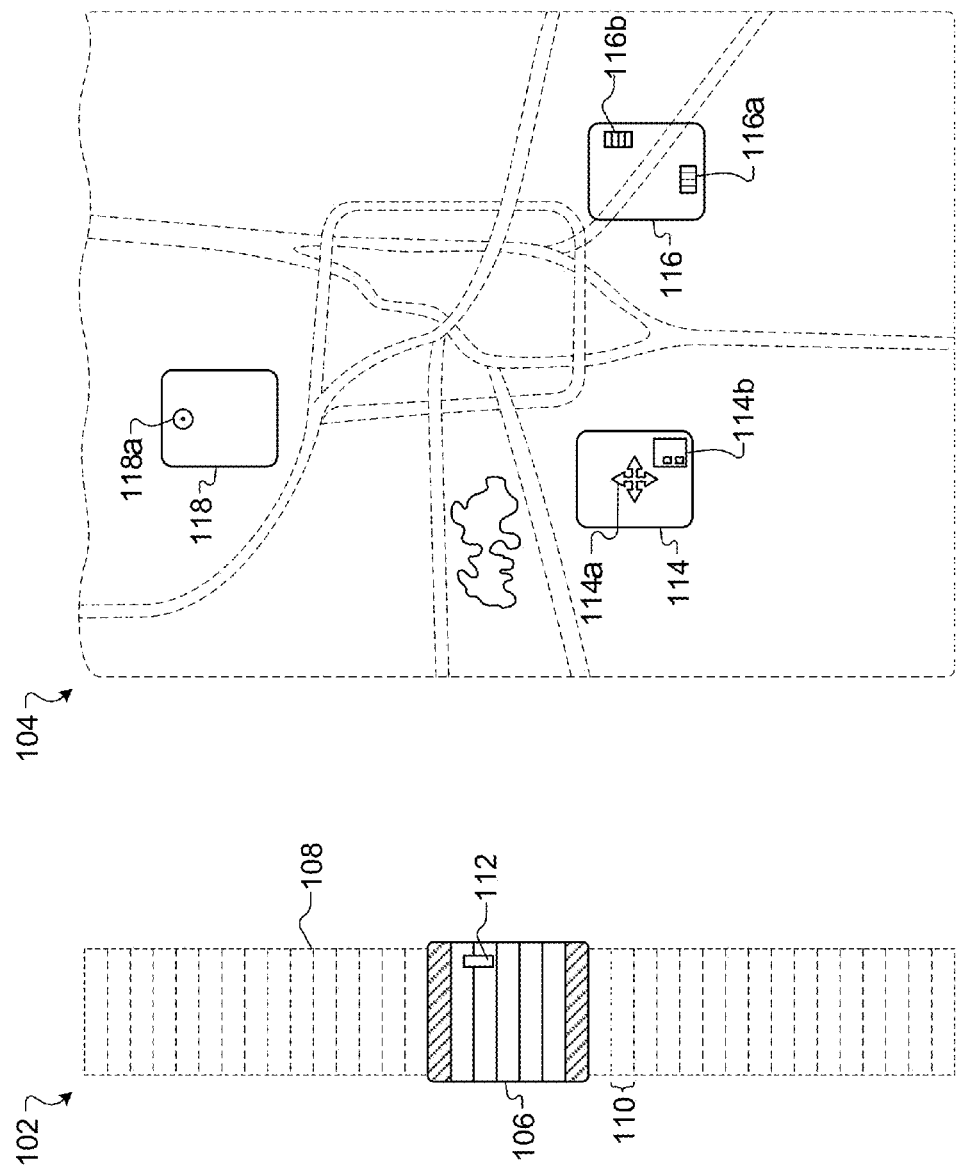

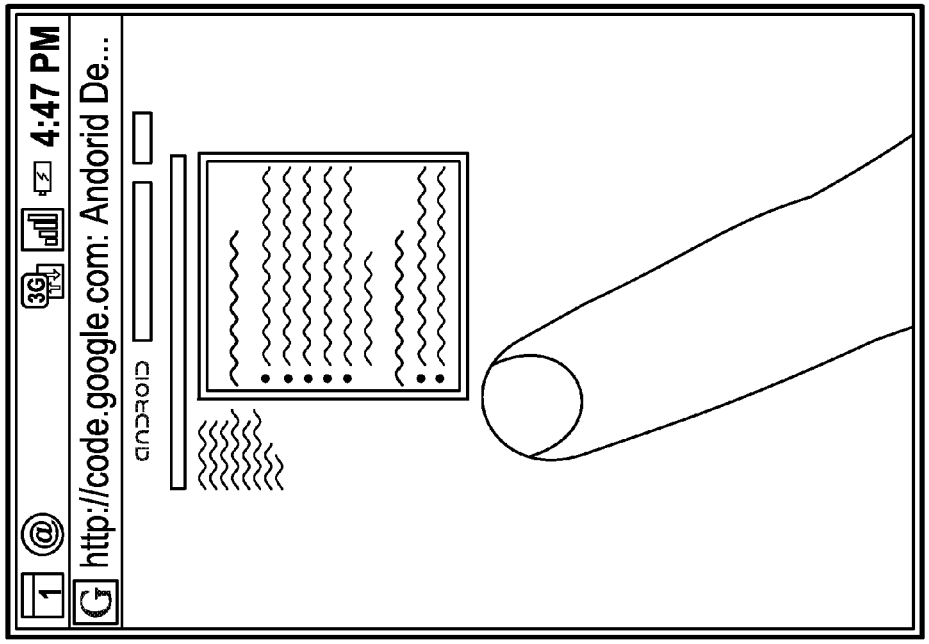
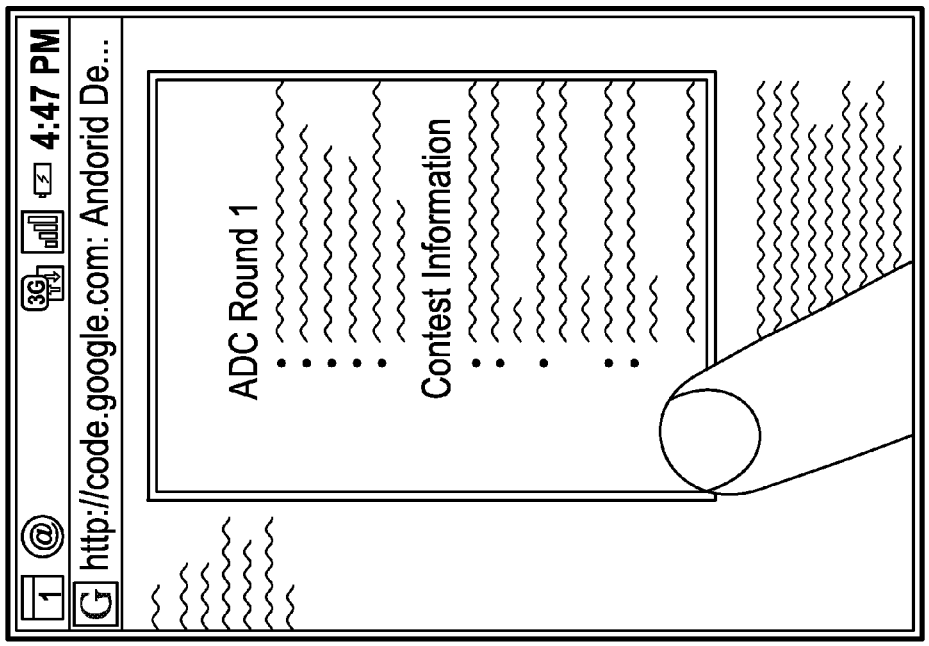
FIG. 2C

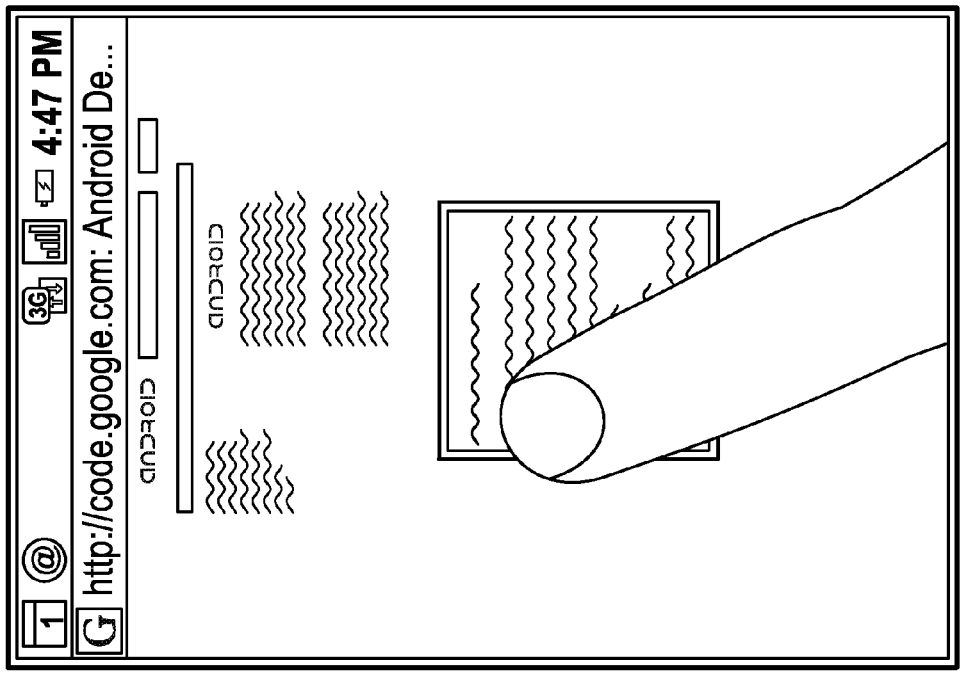
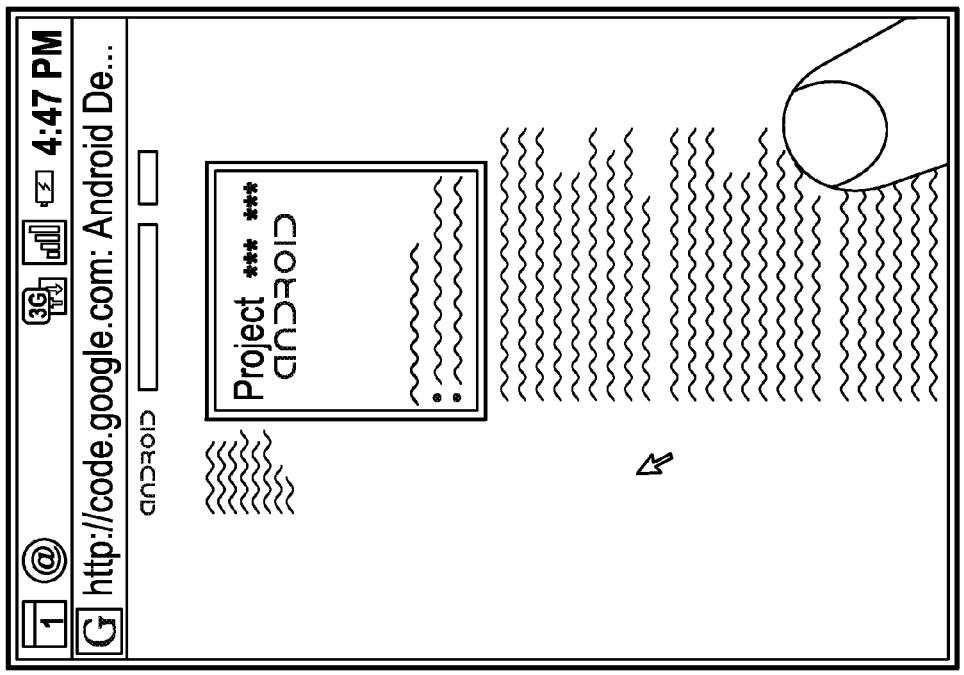
FIG. 2C (Cont.)

ACCELERATED PANNING USER INTERFACE INTERACTION

CLAIM OF PRIORITY

This application is a continuation of U.S. patent application Ser. No. 14/076,841, filed Nov. 11, 2013, which is a continuation of and claims the benefit of priority to U.S. patent application Ser. No. 13/613,766, filed Sep. 13, 2012, which is a continuation of and claims the benefit of priority to U.S. patent application Ser. No. 12/473,927, filed May 28, 2009, which claims priority under 35 U.S.C. 119(e) to U.S. Patent Application Ser. No. 61/056,823, filed on May 28, 2008, the entire contents of which are hereby incorporated by reference.

TECHNICAL FIELD

This document relates to systems and techniques for generating graphical display elements and controls.

BACKGROUND

People spend hours at a time with their electronic devices—computers, telephones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads, and other such input mechanisms.

As mobile devices become more powerful, users interact with them more by using graphical objects, such as lists of items, maps, images, and the like. The information represented by such objects may be enormous and very large (e.g., a detailed map of the United States would be miles wide), while the displays on mobile devices are very small. As a result, it can be a challenge to provide graphical information in sufficient detail for a user (e.g., by zooming in on one area of an object) while still giving the user a sense of space and permitting the user to move intuitively throughout the space.

SUMMARY

This document describes systems and techniques that may be employed to interact with a user of a computing device, like a mobile telephone having a touch screen user interface. In general, the techniques may react in particular ways to inputs for moving around a multi-dimensional space in two or more directions. In particular, when a user indicates an intent to pan in a space, such as by scrolling in a list or panning in a map or image, the techniques may determine whether the space is a large space (e.g., several times larger than the device display) and may present a noticeable but unobtrusive graphical control element that permits accelerated panning in the space. The control element may be, for example, a scroll bar that is automatically generated along an edge of the display whenever the user begins panning in a large space using touch screen inputs.

In certain implementations, such systems and technique may provide one or more advantages. For example, a user of a device may be saved time in navigating around a large space (which could otherwise require dragging their finger repeatedly across the surface of a touch screen) because they can use the accelerated panning control to move across an entire space with a single finger input. Also, the user may be provided with a contextual indication that shows them where they are currently located within the larger space. For example, the scrolling control may be located along an edge of the display at a location that reflects the user's current location within the space (i.e., the control can be near the top of the screen if the user is near the top of the space). In this manner, the user's interactions with their device may be more efficient and enjoyable, and the user may use the particular applications on their device more often and also be more likely to purchase the particular device.

In one implementation, a computer-implemented visual navigation method is disclosed. The method comprises displaying on a touch screen a portion of a large scale graphical space that is at least multiples larger than the device display. The method also comprises receiving from a user of the device an input to pan within the graphical space, automatically generating a pop up graphical panning control in response to receiving the user input, and receiving a user input to the panning control and providing panning in the graphical space, wherein movement of the panning control in a single selection is able to pan the display across a substantial portion of the large scale graphical space. The pop up control can comprise a slider button located along an edge of the touch screen. Also, the method can further comprise increasing the graphical panning control in size if the user provides multiple panning inputs without selecting the control.

In certain aspects, the graphical space comprises a list of items and the graphical panning control causes accelerated scrolling through the list. Also, the graphical space can comprise a map or image and the graphical panning control can cause accelerated panning across the map or image. The method can also include automatically removing the graphical panning control a determined time after a user selects the graphical panning control. In addition, the method can include displaying on the touch screen, during user selection of the panning control, a miniature representation of the graphical space and an indicator of the user's current location within the graphical space.

In certain other aspects, the method further comprises displaying on the touch screen, during user selection of the panning control, an indicator of a segment, from within a group of discrete segments in the graphical space, that is currently being displayed on the touch screen. Also, the pop up graphical panning control can be generated in response to a long press by the user on the touch screen, or in response to a quick flick input on the touch screen. The control can also be sized relatively proportionately to the size of the touch screen in comparison to the size of the graphical space. In addition, the method can comprise receiving a long press input from the user on the touch screen and generating a zoom control on the touch screen in response to the long press input.

In another implementation, an article comprising a computer-readable data storage medium storing program code is disclosed. The code is operable to cause one or more machines to perform certain operations, where the operations comprising displaying on a touch screen a portion of a large scale graphical space that is at least several multiples larger than the device display, receiving from a user of the device an input to pan within the graphical space, automatically generating a pop up graphical panning control in response to receiving the user input, and receiving a user input to the panning control and providing panning in the graphical space, wherein movement of the panning control in a single selection is able to panning the display across a substantial portion of the large scale graphical space.

In yet another implementation, a computer-implemented user interface system is disclosed. The system comprises a graphical display to present portions of large scale graphical areas, a touch screen user input mechanism to receive user selections in coordination with the display of the portions of the large scale graphical areas, and means for generating an accelerated panning control in response to a user panning selection on portions of the large scale graphical areas. The system can also include a mapping application, and wherein the pop up control comprises a panning control for controlling the mapping application.

The details of one or more embodiments are set forth in the accompanying drawings and the description below. Other features and advantages will be apparent from the description and drawings, and from the claims.

DESCRIPTION OF DRAWINGS

FIGS. 1A and 1B are conceptual diagrams showing navigation mechanisms for large display spaces.

FIG. 2C shows example displays of techniques for providing a user interface for panning and zooming in a large space.

Like reference symbols in the various drawings indicate like elements.

DETAILED DESCRIPTION

Figure 2A:
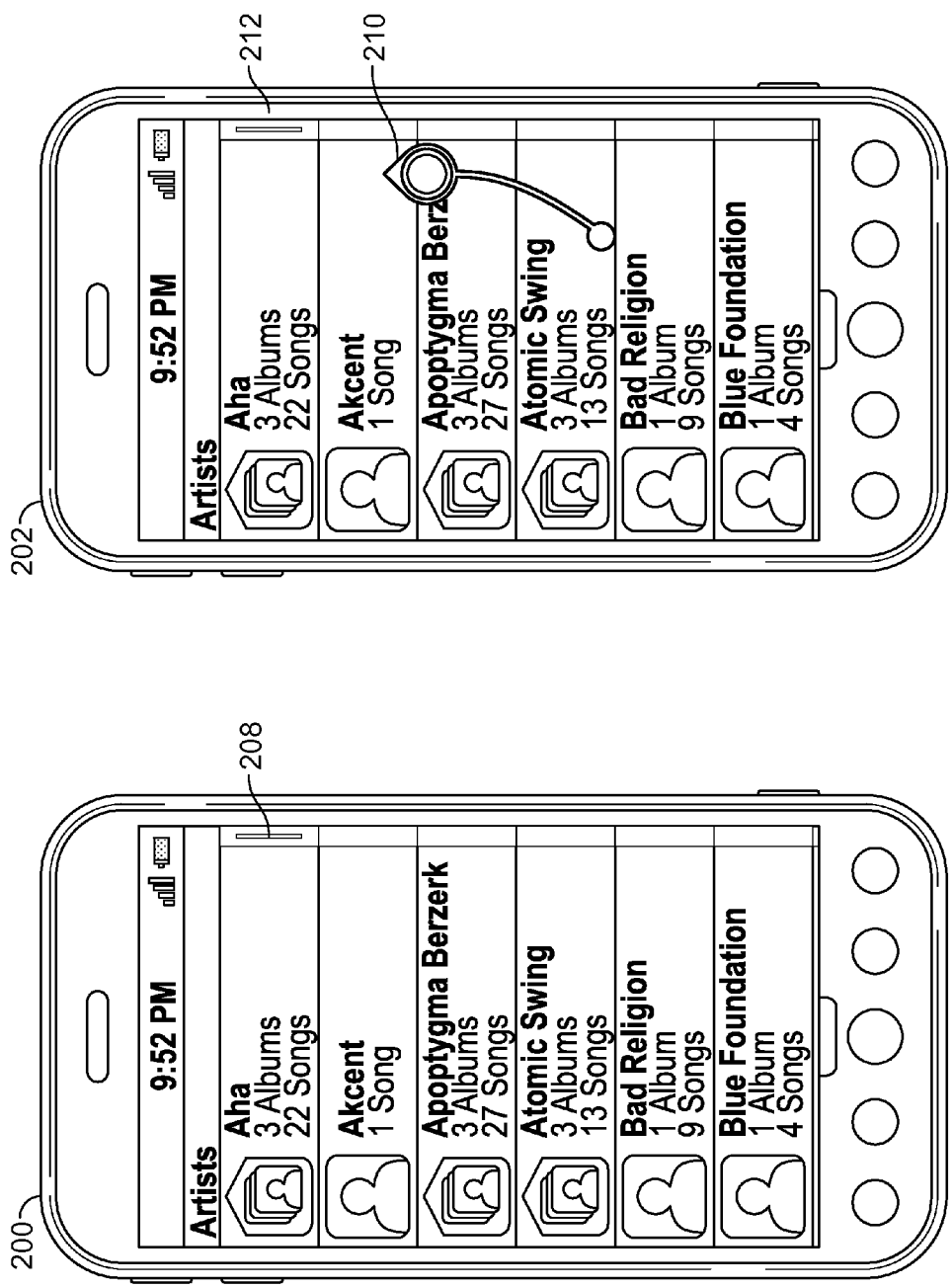
FIG. 2A show sequential displays that may be generating for a user navigating a long list on a mobile device having a touch screen.
Figure 2A:
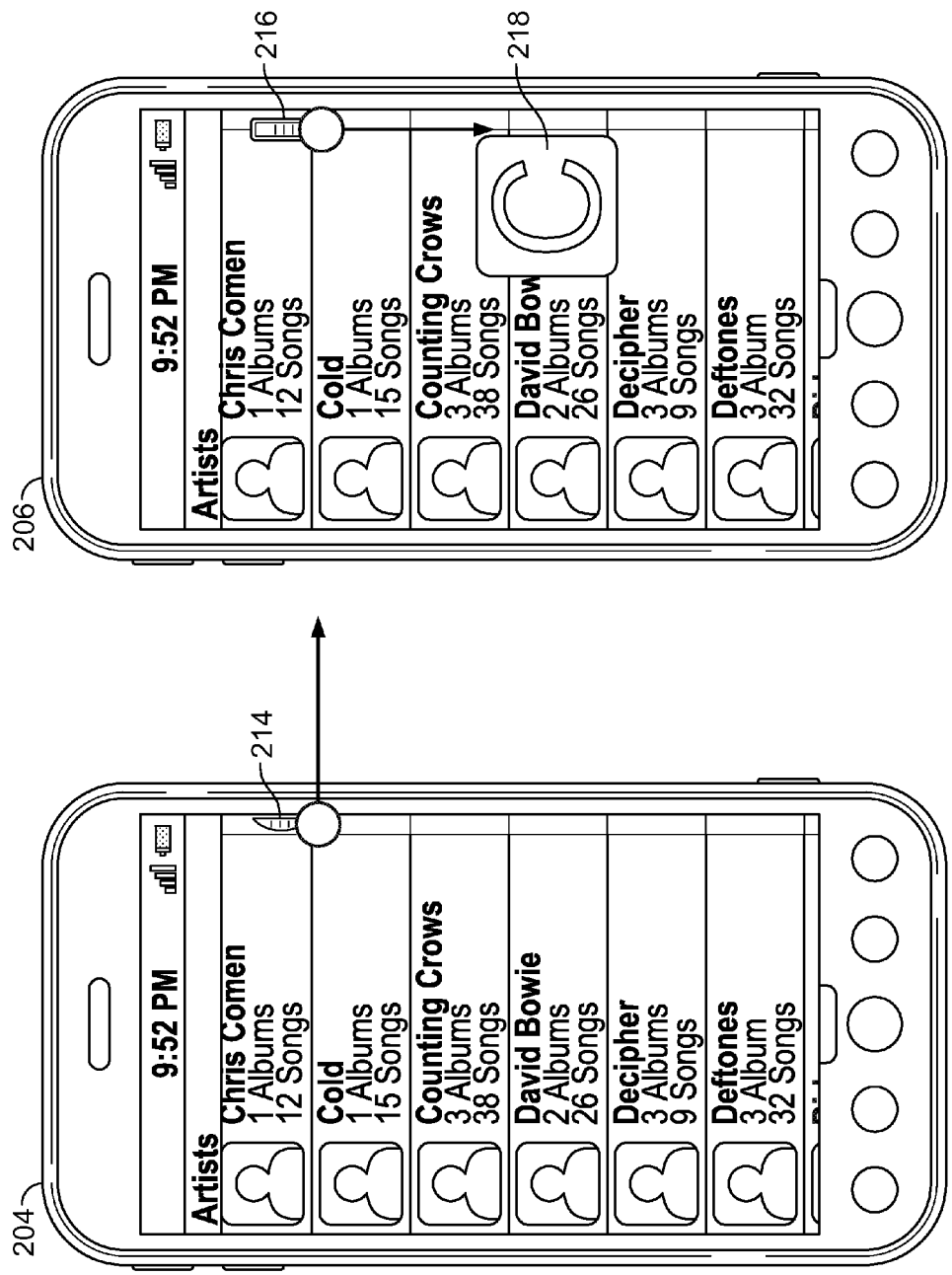

This document describes systems and techniques by which mobile devices may interact with a user of such devices. For example, a user may be shown graphical objects, such as in the form of icons, that indicate to the user where they are located within a large virtual space, and may provide controls that a user may select in order to move visually within that space. For example, when the space is a long list of items such as titles of sings in a playlist on a digital media player, a proportional scroll bar may appear on the edge of a screen when a user starts to scroll. If the user scrolls a sufficient amount or at a sufficient speed, a large letter may appear on the screen to indicate the letter in the alphabet at which they are currently located in their scrolling of the list. Thus, while the list may be blurred, the user may have an indication of where they are in any event. The location of the letter vertically on the display may be comparable to its position within the alphabet, so that the letter "A" will appear at the top of the display, and the letter "Z" will appear at the bottom. The scroll bar can also change appearance as a user scrolls, getting large or otherwise more prominent as a user scrolls more.

In another example, where it is desirable to show a large portion of the visual space but a user cannot fully see the items in the visual space at a zoom level that permits seeing a large portion of the space, a object in the form of a virtual magnifying glass may be provided. Such an object may be an area on the screen within which a portion of the space is substantially enlarged. Such an object may be used, for example, during web browsing, so that a user can see an overall layout of a web page, and can then quickly read or otherwise more closely review, a portion of the page.

In yet another example, the visual space may be a 360-degree panorama at a point in the real world, like that provided by the well-known GOOGLE STREETVIEW service. Such a panorama may be generated by taking digital images simultaneously or nearly simultaneously by a plurality of cameras mounted near a common point and aimed radially outward. Such images may normally be navigated on a desktop personal computer, such as via the GOOGLE MAPS service. In the example here, the images may be navigated inherently by using position-detecting components on a mobile device itself, such as a compass in a compass module provided on the device. Thus, a user can select a geographic location, which may be their current location or a different location, and may then see on their device a view from that location is aligned with the direction that they are currently facing (e.g., as determined by a compass in their mobile device). As they turn, the images on their mobile device will change to match the view, from the selected location, in the direction that they are currently facing if they are holding their device in front of themselves.

FIGS. 1A and 1B are conceptual diagrams showing navigation mechanisms for large display spaces. FIG. 1A generally shows navigation in a long list of items, while FIG. 1B shows navigation across a large map. In each figure, the area to be displayed (which is shown in dashed lines) is substantially larger than the area that is capable of being displayed at one time (which is shown in solid lines). Thus, mechanisms are discussed here that assist a user in navigating across the spaces in ways that are more convenient than repeatedly panning across display-after-display-after-display until the user finally gets to their desired area.

Referring now to the example in FIG. 1A, there is shown a graphical system 102 that comprises a list 108 of items stored on a mobile device. The items may include things such as personal contacts associated with a user, songs or records in a user's music collection, various files stored on a device, video files that may be played conveniently on the device, or other appropriate groups of items that are displayable in a list format. An individual item 110 may be displayed to the user with a variety of information indicative of the item. For example, where the item is a contact, the displayed information may include a name of the contact and a telephone number for the contact. Where the item 110 is a musical group, the system may display an image of the musical group or an album cover for the musical group, a name of the group, and the name of a song, albums, or other appropriate information regarding the group. Where the item 110 is a file in a list of files, the system may display the file name, a size of the file, and a last-saved date for the file.

A display 106 is shown superimposed near the middle of the list 108. The display 106 in this example represents a typical portrait-formatted video display from a mobile device, and may be approximately 3 to 4 inches measured diagonally. The display 106 is shown as a window, in effect, over the list 108, to represent that a user may scroll through the list to see various different portions of the list 108 at one time by way of the display 106.

Conceptually then, the list 108 moves up and down beneath the display 106, and the display 106 serves as a window onto the list. In an implementation, the manner in which the list 108 is sorted and the manner in which the display 106 fetches and formats items from the list 108 for presentation to a user may occur according to standard mechanisms. The top and bottom of the display 106 are shown as being shaded to indicate that items in the list 108 may fade to black near the top and bottom of the display 106 so as to provide a user with the impression that the items are effectively on a -dimensional reel that the user is spinning as they navigate up and down the list.

The display 106 may be integrated as part of a touch screen structure, so that a user may drag the list 108 up and down by sliding their finger up or down, respectively, on top of the list, in an intuitive manner. However, where the list 108 is very long, sliding a finger on display 106 or flicking on display 106 to provide momentum in panning up and down the list 108, may be a slow method for providing such panning because the user will have to repeat their motion many times. As a result, a visual control 112 is displayed on display 106 to assist in such panning across the long list 108. The control 112 may take the form of a slider button that will be familiar to users from various applications that involve the use of scrolling bars, such as desktop productivity software (e.g., spreadsheets and word processors). The control 112 may be displayed in a scrolling bar to the side of the list 108, or as an element that visually floats over the elements in the list 108.

The control 112 may take a proportional form, as is well-known in the art, in that the control 112 may be shorter if list 108 is longer. In such a situation then, the control 112 may take the user to the top or bottom of the list 108 by the user dragging the control 112 to the top or bottom of its predetermined positions within display 106. In particular, a shorter control 112 may represent the relative smaller area being displayed by display 106 where list 108 is a very long list. As a result, each movement of control 112 through a span equal to the height of control 112 may approximate the movement across one display 106 of list 108. In other words, equal movement by a user of control 112 may result in much more corresponding movement of items across display 106 when control 112 is small, than when control 112 is larger and list 108 is thus shorter.

The control 112 may take a variety of other forms also. For example, the control 112 may be placed elsewhere on the area of display 106 such as being overlaid over the middle of display 106. In certain implementations, however, it may be preferred to locate control 112 as far out of the way of the display 106 as possible, so as to avoid obscuring the content of display 106 by a user's finger or other pointer.

The movement of a control 112 in a particular direction may drive the movement of list 108 across display 106 in the same or an opposite direction, depending on the implementation. For example, the dragging of control 112 downward may visually drag list 108 downward, and thus make it appear that display 106 is climbing the list, and that control 112 is attached directly to the list 108, though perhaps in a form of accelerating linkage. Alternatively, movement of control 112 down may cause list 108 to move upwards through display 106, leaving an impression that control 112 is connected to display 106, perhaps by way of an accelerating linkage.

FIG. 1B shows a number of example displays 114, 116, 118 that provide windows into a map of a metropolitan area, here the Minneapolis-St. Paul metropolitan area. The map 104 in this example is highly simplified so as to permit a clearer view of the components in the various displays 114, 116, 118. In each instance, the displays 114, 116, 118, may show only a small portion of the map at one time, so that mechanisms are provided to permit easy and intuitive panning across the map 104 for a user of a device, such as a mobile device having a touch screen.

A first display 114 represents a user of a mobile device viewing a zone in the Southwest metropolitan area. Display 114 shows the generation of a four-headed arrow 114a over the surface of the map in display 114. A user may drag the arrow 114a up, or down, or sideways, to indicate an intent to pan around the map 104. In one example, panning by a user before the arrow 114a is displayed (e.g., dragging a finger across the map) may cause display 114 to move only several miles in one direction across the metropolitan area. In contrast, after the four-headed arrow 114a is displayed, the user may drag the arrow 114a into the upper right-hand corner of the display to thereby cause display 114 to move to the upper right corner of the map 104, in the Northeast zone on the metropolitan area. Other such exaggerated or accelerated motions may also occur via manipulation of the arrow 114a.

The display 114 also includes a small overview map 114b of the entire map area. Map 114b is provided in a familiar manner, and shows a large box that represents the entire mapped area available to a user in a current zoom level and a smaller box that represents the current display 114 of the user, so that the user may readily identify their location relative to other locations in the larger map. Major features from the map 104 may also be displayed inside map 114b, though all features likely will not be displayed because map 114b is much smaller than map 104.

Display 116 shows slider controls 116a, 116b, that operate in a manner similar to slider control 112 in FIG. 1A. In particular, a user presented with display 116 may initially be shown only the map information filling up their entire display 116. If they begin to pan in their display 116, across map 104, or flick to pan so as to indicate that they want to pan a long distance, controls 116a, 116b may be generated and shown to the user. The user may then pan all the way to the left or right of map 104 by sliding control 116a all the way to the left or right of display 116. In a similar manner, display 116 may be moved all the way to the top or bottom of map 104 by sliding control 116b all the way to the top or bottom of display 116. In this manner, the user may quickly move about map 104 using the controls 116a, 116b to accelerate their motion across the map 104, so that a single swipe on display 116 may move the display 116 much farther then would a normal panning motion directly on the map in display 116, and not using the controls 116a, 116b.

Display 118 provides for navigation similar to that shown in display 114, but with an annular ring displayed over the map 104. The location of the ring 118a on display 118 indicates the relative position of the display 118 on map 104. In particular, here, the display 118 is near the top of map 104 and slightly to the left, and likewise, the ring 118a is near the top and slightly to the left on display 118. The user may then drag their finger in the area of display 118, but not on ring 118a, to pan slowly across the map, or may place their finger on ring 118a to pan quickly across the map 104.

Thus, the mechanisms of FIGS. 1A and 1B show various mechanisms for allowing a user to navigate within a large virtual space, whether the space is along a single dimension or in two dimensions. These mechanisms may provide the user a sense of their current location within the large space, as well as a selectable control or controls to let the user control their computing device so as to pan around the space. The mechanisms shown here may be particular useful for touch screen devices, and more particularly mobile devices having touch screens.

Referring now again to a display of a long list of items, FIG. 2A shows sequential displays 200-206 that may be generated for a user who is navigating a long list on a mobile device having a touch screen. In this example, the list is a list of music groups or singers, that could be shown conceptually like the list 108 in FIG. 1A.

Display 200 shows seven different groups, with the group name, the number of albums stored on the user's device for that group, and the total number of songs on those albums. In addition, a graphical icon is shown for each group, where the icon indicates whether a single album or multiple albums are available for that group. Where available, album cover art may be downloaded manually or automatically, or other images may be inserted for the icons.

A slider control 208 is shown along the right-hand edge of display 200 in this example. The slider control 208 may be shown whenever the display 200 is showing a list that is larger than the display 200, or may be shown only in particular contextual circumstances (e.g., only after particular actions by a user that indicate an intent by the user to pan a long way across a representation of data), as described more fully above and below.

Display 202 shows the action of a user flick across the screen upward from a pictured small dot to a pictured larger dot and ring. The particular graphic shown here would typically not be shown on display 202, but instead is provided here to show a typical user input on the display 202. The flick 210 may result in the generation of slider control 212 on the display 202, in situations where the slider control was not previously displayed. In this example, the user is at the top of the alphabet in the list, so the slider control 212 is shown at the top of display 202. The size of the slider control 212 may be generally proportional, or inversely proportional, to the length of the list shown on display 202. For example, here, slider control 212 is about 1/10 the height of display 202. As a result, one may conclude that the list includes approximately 60 artists. The size of control 212 may also be related to the length of the list, but not necessarily proportionately sized against display 202. For example, a minimum size for slider control 212 may be specified, so that even if the list includes thousands of entries, the slider control 212 will be large enough for a user to see it adequately and select it without frequent errors.

Display 204 results from the flick 210. In particular, the list of artists has scrolled upward and has rested two letters further down the alphabet. Notice that the movement involves momentum, because the flick 210 spanned only the distance of two artists, but the display has scrolled down through several dozen artists. The particular speed of the flick may determine the distance that is scrolled so as to approximate the action of a physical spinning wheel or similar physical object that a user might flick, in what is a familiar manner to a skilled artisan.

Additionally, the control 212 has changed in two relevant manners, to become control 214. First, because control 214 is a scrolling control, its position has moved down slightly from its position as control 212, to reflect that the user is further down the list in display 204 in comparison to display 202. In addition, the control 214 is more prominent than control 212, to bring it to the user's attention more readily. For example, the control 214 has begun to thicken and bulge slightly at its center to signify to the user that it may be selected for particular contextual functions.

In this example, the control 214 may be used to conduct accelerated panning up and down the list of artists. For example, the control may be dragged all the way down the side of display 204, and although such motion will span only five artists as they are currently shown on the display, it can result in motion of the list all the way down to the letter Z, perhaps across hundreds of artists.

The control 214 may be made more prominent in other ways also. For example, the control 214 may be made brighter as an alternative to, or in addition to, increasing the size of control 214. The control 214 may also be rendered so as to appear to stretch and to look under pressure as the user conducts repeated flicks like flick 210. In this manner, the user may see more urgency in employing control 214 to conduct accelerated panning, since multiple flicks on the list itself should indicate that the user truly would benefit from accelerated panning rather than having to perform so many manual flicks. In addition, the color of the control 214 may change, both as a user performs one or more flicks across the surface of a list, and also as the control 214 moves up and down the edge of a display, so as to bring the control 214 more to the user's attention as they provide inputs that indicate that they may have a need for the control 214.

Display 206 represents a change resulting from a user selection of control 214 as shown by the dot at the bottom of control 214 in the arrow leading to display 206. The dot on control 216 indicates that a user has maintained pressure on the control 216 and is about to scroll down through the list on display 206. Such a selection may cause the control to change shape again from that shown by control 214 to that shown by control 216. In addition, an index letter for the items in the list is shown in a familiar manner to provide additional guidance for a user. The index letter 218 represents a discrete grouping of the elements in the list, here a letter of the alphabet to represent the starting letter of the artist that is shown at the top of display 206. The index letter 218 may take other forms also, such as a numeral representing a size of a file stored on a device, or any other indicator by which a list of items may be classified into discrete groups.

The index letter 218 may be displayed in a variety of manners. In this example, the index letter 218 is located near the edge of the display so as to minimize the manner in which it may cover the artist names, but may also be made partially or wholly transparent to permit viewing of the names even when they are positioned under the index letter 218. In addition, the index letter 218 may move up and down on the display 206 along with the movement of control 216. For example, the index letter 218 may be anchored just to the left of control 216 a sufficient distance so that the index letter 218 may be seen by a user even while their finger is on control 216. However, the index letter 218 may move up and down the side of display 206 along with the control 216. In such a manner, the user may more readily focus on the letter being displayed and be able to navigate more closely to the artist in which they are interested, because they may watch and move their eyes along with the fingers that they are moving.

The index letter may change as the letters in the list in display 206 change, so that, for example, if there were many artists in the list that started with the letter A, but few that started with the letter C, very little motion of control 216 would be required to pass through the letter C as an index letter 218, as compared to passing through the letter A. Alternatively, each index letter, here A to Z (and perhaps 0 to 9), may have an equal division in comparison to the movement of control 216, so that movement down one 26th of display 206 will always result in the changing of one letter in index letter 218, for example.

In some implementations, the index letter may change as the user slides the control 214 up and down, but the items in the list may stop moving when such control is occurring. Thus, there may be two modes of control—normal panning where the items in the list scroll up and down as the user pans, and accelerated panning, where the items no longer move, and an index letter is cycled through in an accelerated manner as the user moves the control.

Using the techniques described herein, a user may readily navigate in small movements by dragging their finger across a display of a list. The user may navigate in larger movements by flicking across the display with their finger so as to give it virtual momentum and thereby move more than one display at a time in the list. The user may also be provided a convenient option for scrolling in an accelerated manner through the list, without having to take up unnecessary interaction—via the presentation of a control that is hidden until the user indicates an intent to pan or scroll through the list.

Figure 2B:
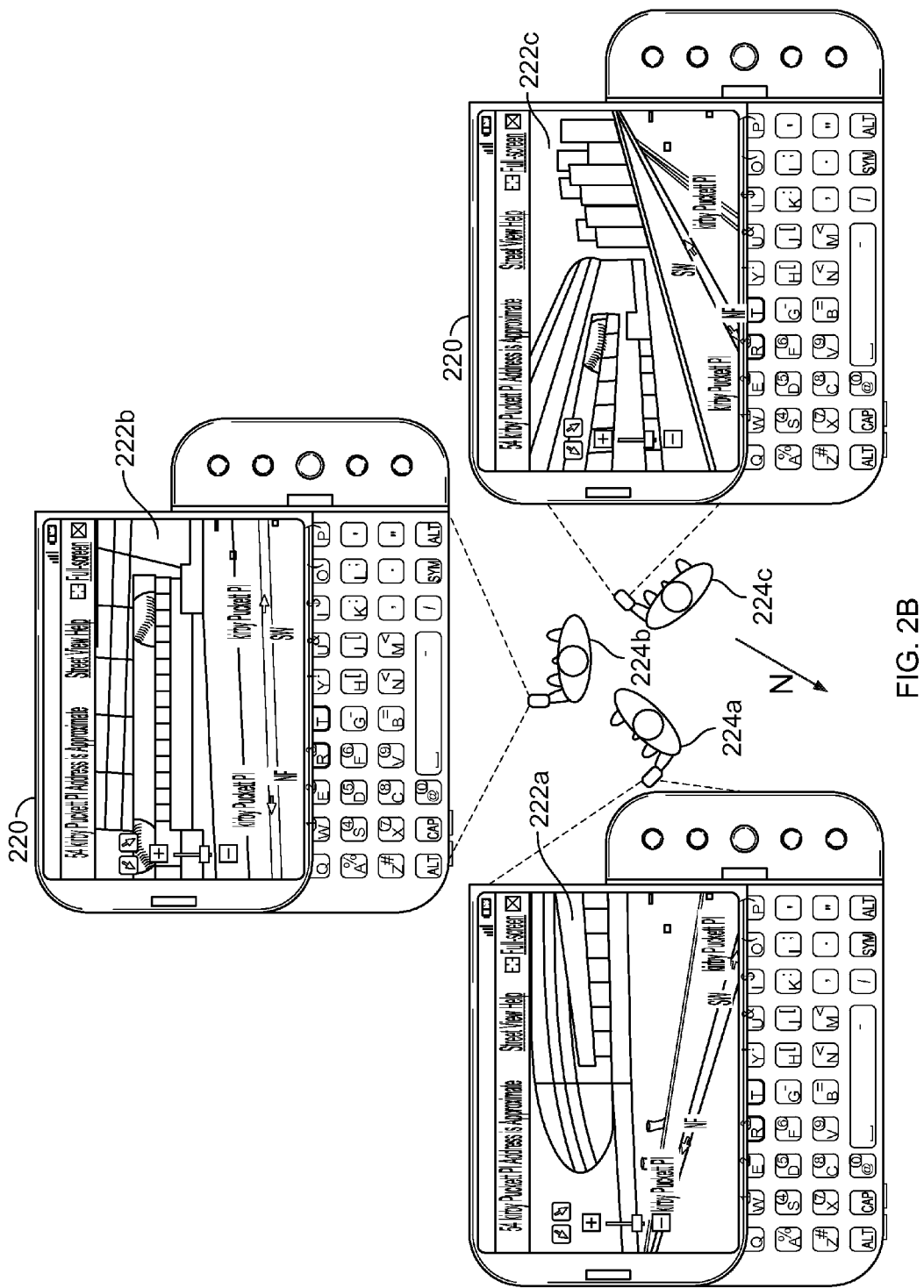
FIG. 2B shows displays that may be generated for a user by a mobile device according to the motion or position of the mobile device.

FIG. 2B shows displays that may be generated for a user by a mobile device according to the motion or position of the mobile device. In general, any number of mobile devices can be configured to detect various kinds of motion. For example, in some implementations, the mobile device may include an electronic compass that can be used to detect a change in heading, according to the Earth's magnetic field (e.g., the North and South Poles). As such, when a user holding the mobile device turns or otherwise changes the heading of the mobile device in relation to the direction of the North Pole, the mobile device can detect the change in heading. As another example, the mobile device may include an accelerometer that can detect a change in motion. As such, when a user holding the mobile device lifts, drops, shakes, or otherwise accelerates or decelerates the mobile device, the mobile device can detect the change in acceleration. In some implementations, these detected motions can be used to update the display on the mobile device automatically.

Referring now to the examples shown in FIG. 2B, a mobile device 220 is shown being held by a user 224a-224c, in different orientations or directions. The user 224a-224c is shown with particular headings (according to the "North" arrow). That is, the same user is shown with different headings according to a compass included in the mobile device 220. In general, the mobile device 220 may include a web browser or other software application(s) that allows the user of the mobile device to access a map of a particular area. In some implementations, the map also includes images of the area that are captured from a street-side vantage point. One such example is STREETVIEW from GOOGLE (Mountain View, Calif.). The user 224a-224c can provide an address to the web browser or other software application(s) to generate a view (in the form of a map, satellite image, or combination of the two) of the area surrounding the provided address. In some implementations, the mobile device 220 may automatically provide the address (as the current address where the user is located) using a global position system (GPS) or other systems designed to locate the mobile device automatically.

The user may initially provide address information—here the address of the Hubert H. Humphrey Metrodome—and may be provided with map tiles and other map data in a familiar manner for the area around "The Dome." The user may then further select to be presented with a street view in an area around The Dome. While the user may be located, for example, in their home, they may be displayed images from the outside of The Dome that were taken by a car that passed the dome at an earlier time. The user may obtain the view alternatively, via a search, such as by the query "Metro-Dome," which may return an address as a Onebox result that includes a link to the map of the area around the structure, and they may then choose to see images from a point on the map.

The direction in which the person is looking in a virtual manner via STREETVIEW may be coordinated with the compass direction the person is facing in their own frame of reference. For example, as the user 224a-224c moves, the mobile device 220 generates displays 222a-222c of a particular region according to the map data, the location of the mobile device, the heading of the mobile device, and/or other information that can be detected by the mobile device (e.g., acceleration exerted on the mobile device 220). For example, user 224b is looking generally SSE, and is thus shown the view in the area near the Dome that is oriented in a similar direction.

If the user turns to their left (e.g., in a heading illustrated as user 224a), the mobile device 220 can detect the motion or direction of the user (e.g., the change in heading) and automatically pan the view to match heading of the user, which is illustrated as display 222a. That is, the mobile device 220 now displays (in display 222a) a different portion of the Metrodome according to new heading detected by the mobile device 220. If the user turns to their right (e.g., in a heading illustrated by user 224c), the mobile device 220 can detect the motion of the user (e.g., the change in heading) and automatically pan the view to match the current heading of the user, which is illustrated as display 222c.

The heading of the device may be matched easily to relevant heading data that identifies portions of the image or images that make up the particular street view. Where there are multiple images, they can be made to appear seamless to a user by serving them in succession and blending them at their edges. In this manner, the user can be provided with the effect of viewing on their mobile device the area around the point at which the images were captured, even though the user may be far away from such a location.

In some implementations, an accelerometer can be used instead of, or in addition to, a compass on the mobile device 220. For example, as the user walks, the accelerometer can detect the motion (e.g., shaking, walking, change in elevation, orientation, or other motion) and update the displays 222a-222c accordingly. For example, the mobile device can detect that user is moving based on detected accelerations and can pan the displays 222a-222c as if the user were walking down the street. The user may also simply shake the device in space to cause forward motion to occur in the displayed space, much like selection of a travel arrow in GOOGLE STREET-VIEW causes the user to move virtually down a street. As another example, the mobile device 220 can detect a change in the orientation of the mobile device (e.g., according to acceleration detected by the accelerometer) and can pan the displays 222a-222c up or down as if the user 224a-224c were looking up or down, where the graphical images provided by a remote server to the device include such panoramic photographs.

The direction shown by the device may also be relative rather than absolute, and particularly where an accelerometer is used and a compass is not. In particular, the initial orientation of a view that is provided to a user may initially be selected by a rule rather than a particular direction that the user is facing. Then, relative motion by the user rotating to the left or right may be sensed by an accelerometer on a device, and the images of the geographic locality that the viewer is reviewing may be panned relative to such motion, though perhaps not in a manner perfectly proportional to the user's motion. For example, the user may rotate 90 degrees, while the display may be made to rotate only 60 degrees in the same direction because of limitations in the ability of the user's device to sense absolute motion.

FIG. 2C shows example displays of techniques for providing a user interface for panning and zooming in a large space. In general, the figure includes four screen shots (a)-(d) that show different points in time in the use of a user interface mechanism for zooming on web pages. A web page may be raised initially in a relatively zoomed out level, as shown around the edges of display (a). By zooming out on the page, the user may more readily browse the page to find relevant content in context. To indicate a desire to zoom in, the user may double tap on the page, via a touch screen input mechanism. The double tap may result in the generation of a magnifying zoom box, which is shown in screen shot (a) in the process of appearing in a large format so that it is brought readily to the user's attention, and it then shrinks to a size that represents the area that will be shown if the user chooses to zoom in.

At shot (b), the user is shown moving their finger toward the zoom box, and the user may press on the box and drag it around until it lies over the area the user would like to review more closely. To provide a contrast between the content inside the zoom box and the content outside, the content inside may be increased in size slightly as the box is moved around, as shown in shots (b)-(d). The zoom box may also trail the user's finger slightly when the motion starts (see trailing box in shot (d), where the user's finger is moving toward the lower left corner). The box may then "catch up" in a springy fashion once the finger stops moving. This may provide the user with a better sense that they are dragging the box, and may also keep the finger from fully covering the zoom box while it is being moved around.

When the user has moved the zoom box over the content they would like to see more closely, they may lift their finger, thus leaving the zoom box in the location where they lifted. Such an action may also cause a display manager to automatically zoom in on the area in the zoom box until the area inside the zoom box fills the entire display. a user may then pan on the page by dragging their finger on the touch screen or by rolling a trackball, and may choose to zoom back out by again double tapping on the screen.

Figure 3:
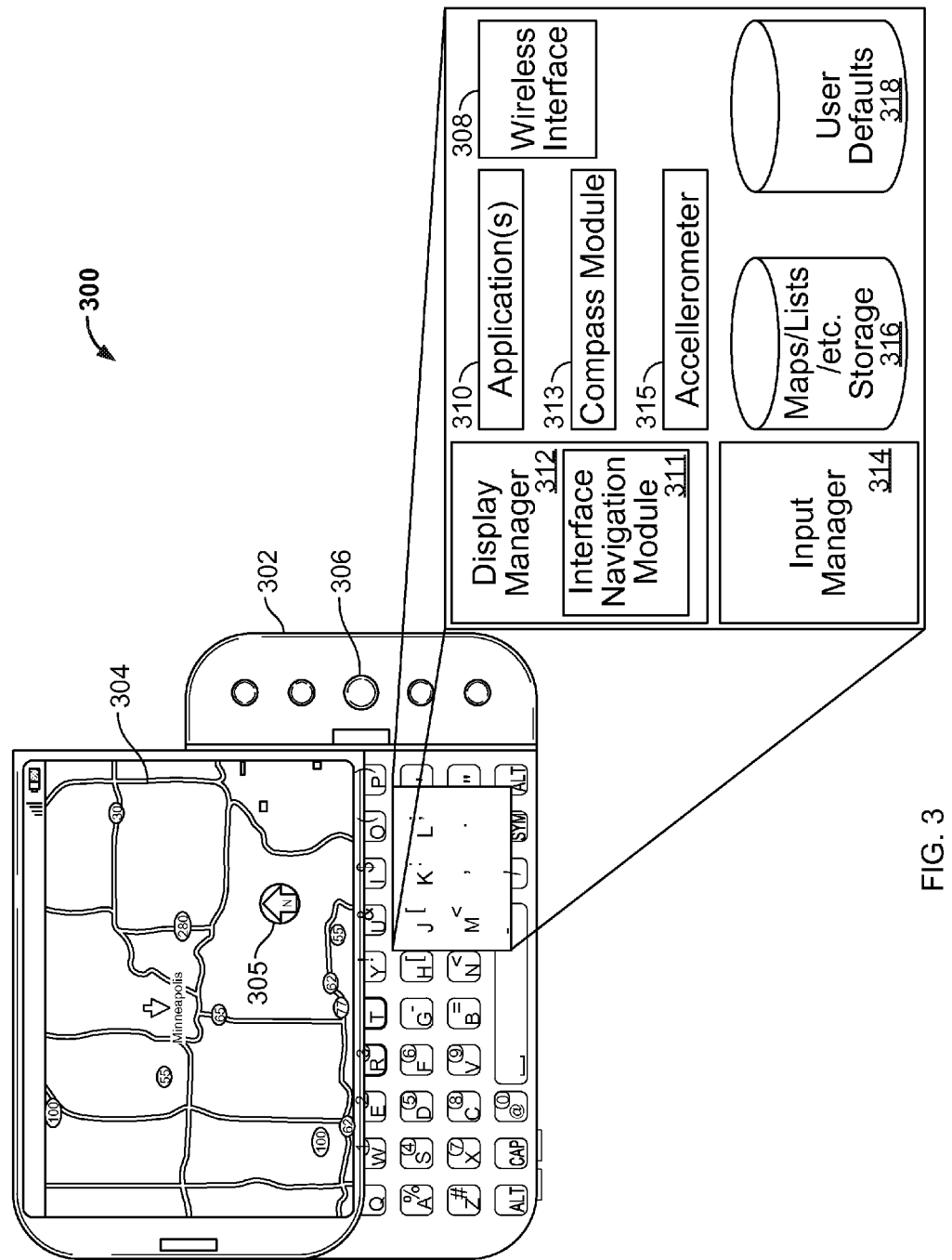
FIG. 3 is a schematic diagram of a system that provides user interaction in response to touch screen inputs.

FIG. 3 is a schematic diagram of a system 300 that provides user interaction in response to touch screen inputs. The system 300 may be implemented using a mobile device such as device 302. The device 302 includes various input and output mechanisms such as a touch screen display 304 and a roller ball 306. A number of components within device 302 may be configured to provide various selection functionality on display 304, such as movement within large spaces which exceed the size of the display 304, as described above.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 304 may need to be displayed, and the display manager 312 may determine which to display, which to hide, and what to display or hide when there is overlap between various graphical objects.

The display manager 312 can include various components to provide the device 302 with particular functionality for interacting with displayed components, which may be shared across multiple applications, and may be supplied, for example, by an operating system of device 302. Such functionality may be provided, for example, by interface navigation module 311, which may be responsible for receiving input from a user wanting to move between and among elements on display 304. In this example, a control 305 is shown on display 304, and may be similar to control 118a on display 118 in FIG. 1B. In particular, the positioning of control 305 on display 304 may represent to the user that they are looking at a portion of their map that is in the Southeast corner of the entire map.

If the user drags on the map, interface navigation module 311 may initially cause control 305 to be displayed, and may cause the map to pan an amount related to the dragging motion. Subsequent dragging on the map, but away from the control 305 may cause more panning of the map, and the control 305 may, in certain circumstances, move a small amount if the location of the control 305 on the map corresponds to the location of the map sub-section shown on the display 304 relative to the overall map. Interface navigation module 311 can likewise provide for other changes in the display 304 in response to user input, such as those described above and below.

Individual applications 310 can register themselves with the display manager 312 in accordance with an API so as to indicate the sort of display elements they might require. For example, an application may identify a group of data elements as corresponding to a list, and the interface navigation module 311 may then treat such elements as a list visually, e.g., it may show an accelerated scrolling control when the list is sufficiently long and a user input indicates a user intent to scroll up or down within the list.

An input manager 314 may be responsible for translating commands provided by a user of device 302. For example, such commands may come from a keyboard, from touch screen display 304, from trackball 306, or from other such sources, including dedicated buttons or soft buttons (e.g., buttons whose functions may change over time, and whose functions may be displayed on areas of display 304 that are adjacent to the particular buttons). The input may also occur more inferentially, such as from signals provided by an on board compass or accelerometer. The input manager 314 may determine, for example, in what area of the display commands are being received, and thus in what application being shown on the display the commands are intended for. In addition, it may interpret input motions on the touch screen 304 into a common format and pass those interpreted motions (e.g., short press, long press, flicks, and straight-line drags) to the appropriate application. The input manager 314 may also report such inputs to an event manager (not shown) that in turn reports them to the appropriate modules or applications.

A variety of applications 310 may operate, generally on a common microprocessor, on the device 302. The applications 310 may take a variety of forms, such as mapping applications, e-mail and other messaging applications, web browser applications, music and video players, and various applications running within a web browser or running extensions of a web browser.

One application that may run independently or as part of a browser is GOOGLE MAPS and GOOGLE STREETVIEW. Such an application may accept readings from a compass module 313 on the device 302, which may include an electronic compass and related circuitry and software for interpreting compass readings, and an accelerometer 315. The compass module 313 and accelerometer may be used, such as described above with respect to FIG. 2B to sense user motion or orientation, in changing the device's views of a geographic area that has previously been photographed panoramically, and whose digital images are available from a server to the device 302.

A wireless interface 308 manages communication with a wireless network, which may be a data network that also carries voice communications. The wireless interface may operate in a familiar manner, such as according to the examples discussed below, and may provide for communication by the device 302 with messaging services such as text messaging, e-mail, and telephone voice mail messaging. In addition, the wireless interface 308 may support downloads and uploads of content and computer code over a wireless network. One example of data that may be obtained via the wireless network is images provided by an application such as GOOGLE STREETVIEW, where an application running on the device 302 (such as an JavaScript application running on a web page displayed on the device 302) may have access to compass data on the device, and may request new image data around a certain geographical point automatically in response to a user's movement of the device 302.

Various forms of persistent storage may be provided, such as using fixed disk drives and/or solid state memory devices. Two examples are shown here. First, maps/lists/etc storage 316 includes all sorts of data to be used by applications 310, and can include lists of data elements, graphical components like map tiles, and a variety of other well known data structures so that a user can interact with applications on device 302.

Other storage includes user defaults 318, which may be profile information for a user stored on the same media as maps/links/etc. storage 316. The user defaults 318 include various parameters about a user of the device 302. In the example relevant here, the user profile may include data defining the manner in which the user prefers to have panning controls presented on the display 304 (e.g., what the controls should look like, whether a list should scroll with the control or in the opposite direction of the control, the actions by the user that will bring up the control, etc.).

Using the pictured components, and others that are omitted here for clarity, the device 302 may provide particular actions in response to user inputs. Specifically, the device 302 may respond to panning inputs within large areas in particular ways, including by displaying a control that permits accelerated panning in the areas (i.e., panning that is substantially faster than dragging across a panned object, and typically permits navigation from one side of the area to another using a single swipe on the controls).

Figure 4A:
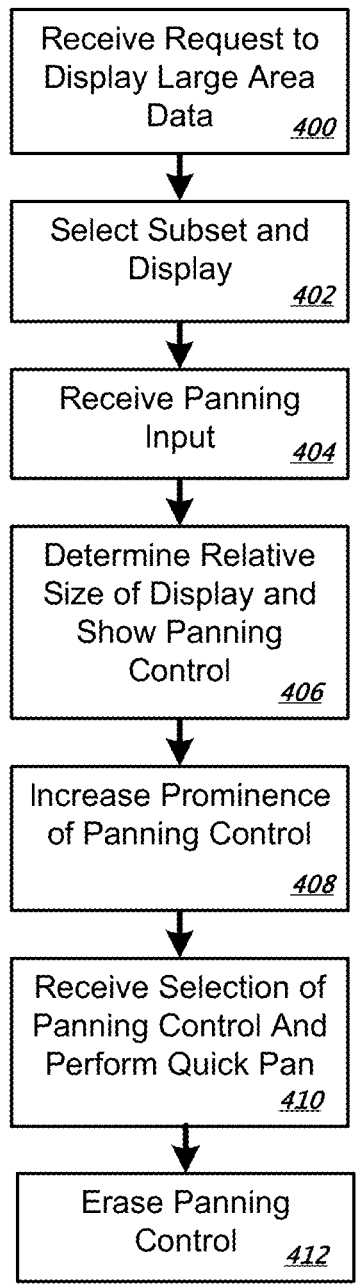
FIGS. 4A-4B are flow charts of example processes for receiving user selections from a graphical user interface.
Figure 4B:
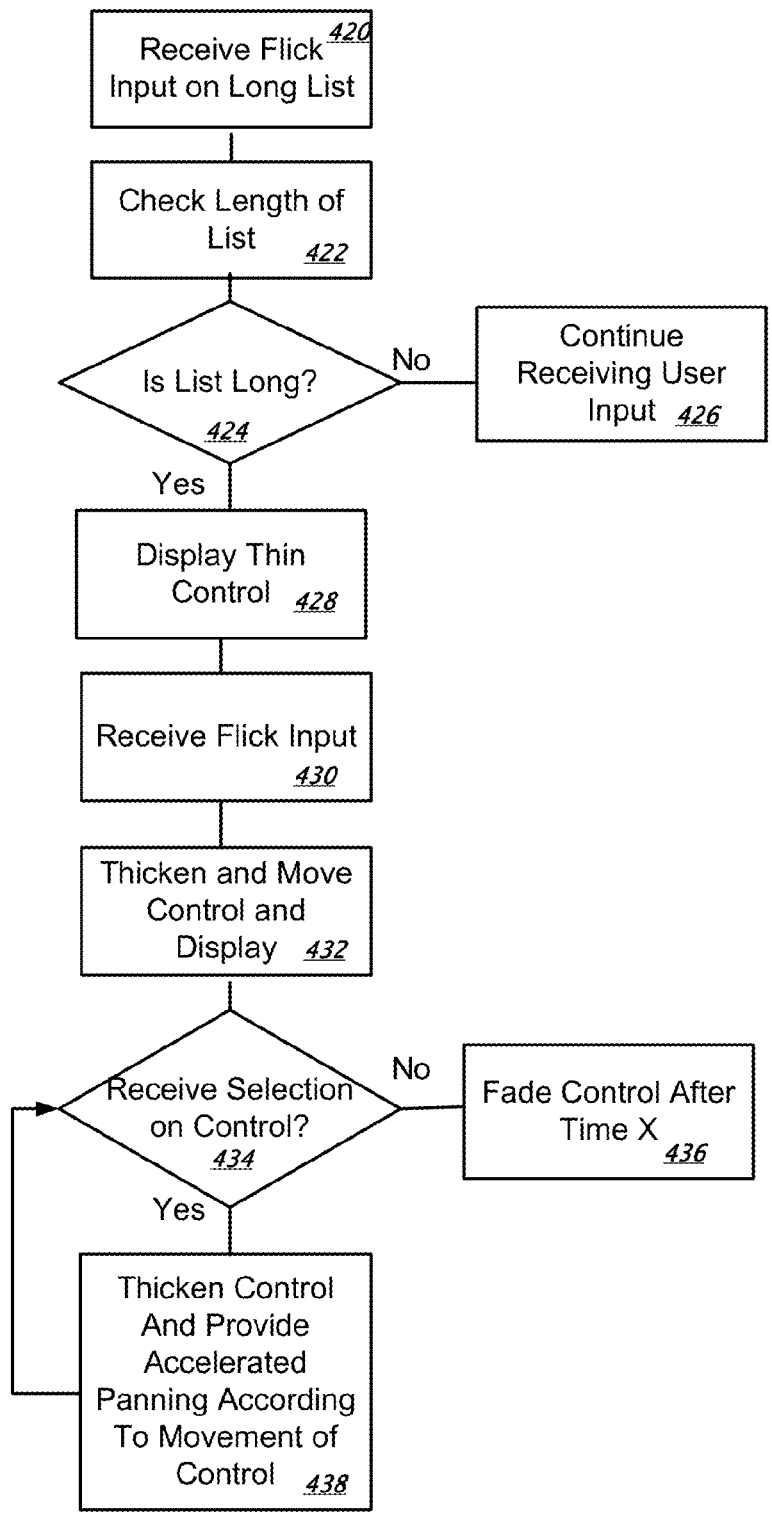

FIGS. 4A-4B are flow charts of example processes for receiving user selections from a graphical user interface. FIG. 4A shows, for example, a process by which a mobile device may respond to inputs on a screen that shows only a relatively small part of a large graphical area.

The process begins in this example at box 400, where a request to display large area data is received. Large area data may include various forms of data whose display extends well beyond the edges of a single screen on a device. Such data may include, for example, long lists of information, and large images, or maps, or similar presentations of information. The request to display the large area information may take a number of forms, such as a search request provided to a device, where the search results include the large area information, such as in the form of a list of files on a computer, on the Internet, or a map generated in response to a search result.

At box 402, the process selects a subset of the large area data and displays that subset. For example, where the large area data is a map, the displayed subset may be a portion of that map surrounding an address that is a result for a search query that was entered by a user. The process then receives a panning input from a user at box 404. Such an input may generally be received by a user moving their finger or a stylus across the surface of a touch screen display.

The process reacts to the user input at box 406, by showing a panning control on the display after determining the relative size of the display in comparison to the size of the entire area of data. The prior determination of the relative size of the display before displaying the control may ensure that a control is not shown if the area of data is the size of the display or only slightly larger than the display. In such situations, panning either does not operate or can be completed easily right on the data, without the need for a special control that can be used to provide accelerated panning.

The display of the control may also be dependent on the speed and manner of the user input. For example, if the user drags slowly across the display, the process may assume that the user is not interested in navigating to far flung corners of the data, and may decline to display the control. Similarly, if the user leaves their finger on the display at the end of their action, such input may be taken as an indication that the user is not interested in panning very far, and thus not in need of an accelerated panning control. In contrast, if the user moves quickly and lifts their finger at the end so as to create a "fling" input, such an input may be taken as a sign that the user intends to pan a long way, so that the control may be generated in such a situation.

At box 408, the process reacts to the user input, such as a "fling" panning input, or by the input of subsequent panning inputs, by increasing the prominence of the input control. Such an action may involve increasing the size or brightness of the control, or, for example, pulsing the control. The prominence of the control may be increased only once, such as when a second panning input is received, or may proceed through multiple increasing phases up to a maximum point. The intent of increasing the prominence of the control is to bring to the user's attention the option of using an accelerated panning control, where the more the user tries to pan on the subject matter itself, the more the user is likely to pan, and the more they need help from the control.

At box 410, the user notices the control and selects it so as to provide accelerated panning of their display. the process responds by quick panning the data in accordance with the user's manipulation of the control. For example, if the user slides the control downward, the display may move downward across a map or list of items at an exaggerated rate as the user watches. After a time of inaction—either of the user not selecting the control and/or the user not making a panning motion on the display that would normally bring up the control—the control may disappear, as shown at box 412. The control may, for example, be faded out so that the user may see any data that may have been located beneath the control.

If the user later repeats a flicking action, the control may be brought back and the steps repeated. However, the control will generally be located in a position that reflects the user's current view of the data area. For example, if the user is currently looking at the middle of a list of videos stored on her device, the control may be generated on the side of the display, midway between the top and bottom of the display.

FIG. 4B shows a process for generating an accelerated panning control with respect to a list of graphically represented items, such as names of contacts, musical artists, or other similar groups of distinct data elements. In general, the process is similar to the process shown in FIG. 4A, but involves more particular responses to user inputs.

The process starts at box 420, where the process receives from a user a flick input (i.e., a fast movement followed by lifting of the finger or stylus) on a long list. The process may then check the length of the list (boxes 422, 424) and if the list is not long (i.e., is not longer than the device display or is not substantially longer than the device display, such as many times as long as the display), the process may continue receiving input form the user (box 426).

If the list is long, a thin panning control may be displayed on a display of the device (box 428), such as in the form of a scrolling handle along one edge of the display (generally the right edge, to avoid covering left-justified text in the list). In addition, the list may be scrolled in response to the flick, and the speed and distance of the scrolling may represent the movement of a physical object, so that the list continues to scroll after the flick, and slows gradually, as if it were being dragged down by friction. Also, the control will move along the side of the display so that it reflects, by its location between the top and bottom of the display, the user's location (i.e., the display's location) between the top and bottom of the list.

At box 430, the process receives a second flick input from the user, and the list may scroll again, as it did after the first flick input. In addition, the fact that the user has flicked twice indicates that he or she may want to go very far down or up the list. As a result, the process, at box 432, thickens the display of the control so that the control will be more visually prominent to the user. The system also checks, at box 434, whether the user has selected the control (though it would generally be checking for such input anytime after the control is initially displayed), and the control fades away if the user does not select it or perform a flick of the subject matter for a determined period (box 436). If the user does select the control, the process thickens the control further so as to make it even easier for the user to manipulate, and then pans the display according to the user's manipulation of the control, such as in the various manners discussed above.

Figure 4C:
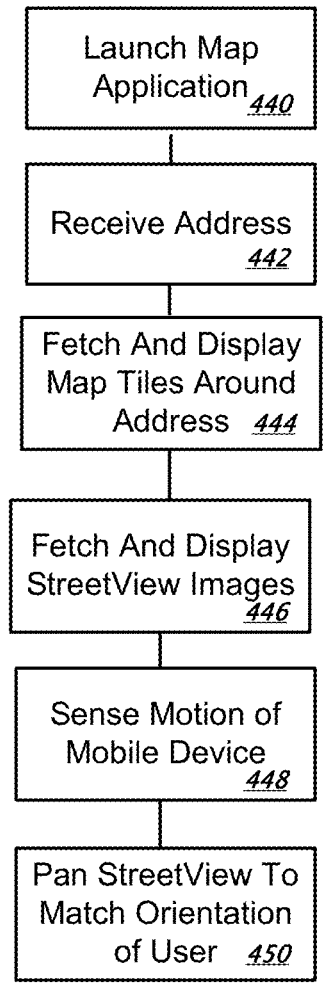
FIGS. 4C-4D are a flow charts of an example process for updating a display according to the motion of a mobile device.
Figure 4D:
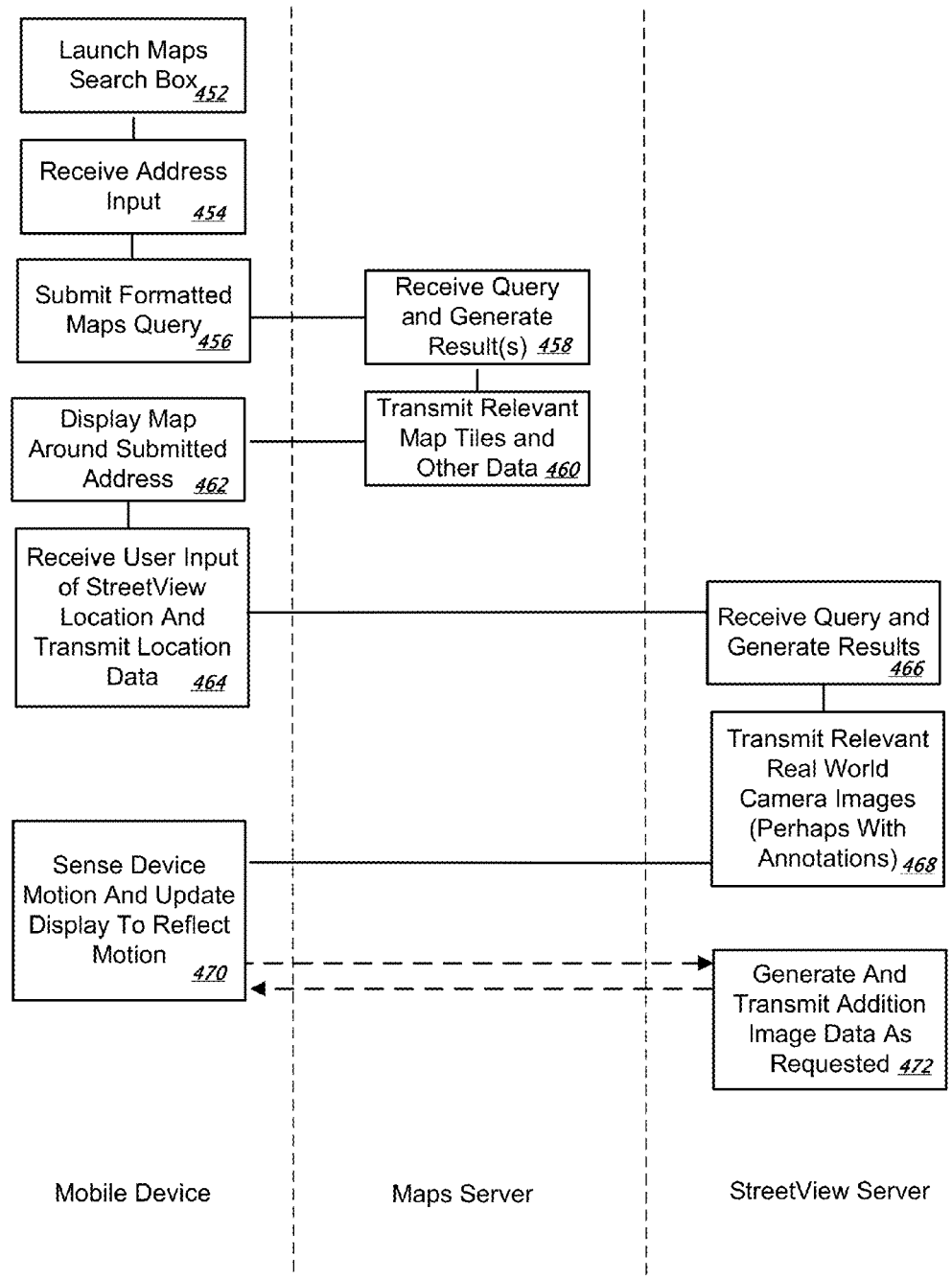

FIGS. 4C-4D are flow charts of an example process for updating a display according to the motion of a mobile device. FIG. 4C shows, for example, a process by which a mobile device may respond to sensed motion of the mobile device. FIG. 4D show, for example, a process that shows example actions that can b performed by additional systems, outside the mobile device, that may be used to sense motion and update the display of the mobile device to reflect the detected motion. In general, the process illustrated in FIG. 4C is described in reference to a mobile device or map application and the process illustrated in FIG. 4C is described in reference to a mobile device, a maps server, or a StreetView server, according to which system is responsible for particular steps of the process.

In reference to FIG. 4C, the process starts at box 440, when a map application is launched. In some implementations, the map application may be launched automatically when the mobile device is booted. For example, the map application may be bootstrapped to the mobile device's initialization routines. In some implementations, the map application may be launched by a user. For example, the user can select an application icon on the display of the mobile device to launch the map application. In some implementations, another process or application may launch the map application. For example, a social networking application may launch the map application when the social networking application presents locations of particular friends to the user.

Once the map application is launched, in box 442, an address is received by the map application. This can be accomplished in any number of ways. For example, the user can input the address manually. As another example, a GPS device located on the mobile device may automatically provide an address.

In box 444, the map application can fetch and display map tiles around the received address. For example, the map application can display one or more tiles that show buildings, parks, streets, or other locations on the mobile device.

In box 446, the map application can fetch and display StreetView images. In general a StreetView image is an image taken from the vantage point of a person, vehicle, and the like at street level. As such, in some implementations, the user of the map application may need to specify the street for which the map application fetches and displays the StreetView images. A first image may be displayed that represents the digital image taken by the camera at the relevant point, facing at a radial angle the corresponds to the present direction that the mobile device is facing.

In box 448, the map application can sense motion of the mobile device. In general, the sensing of motion is accomplished by communicating with one or more systems or modules included on the mobile device that are capable of detecting motion. For example, the map application can communicate with an accelerometer, a compass, or other modules to sense motion of the mobile device.

In box 450, the map application pans the StreetView images to match the orientation of the user (i.e., the orientation of the mobile device). For example, in reference to FIG. 2B, StreetView images are presented on the displays 222a-222c of mobile device 200 according to the orientation of user 224-224c.

Thus, by this process, a user of a mobile device can quickly get a view of an area, such as a shopping district that they are planning to visit, or a neighborhood of a friend where they expect to travel. They can obtain a more immersive experience of the location by holding their mobile device in front of them and turning in a circle while the images on the device pan to match their motion. As a result, the user can quickly see what an area will look like, and can decide whether to go there or not, or can more readily recognize the area when they arrive at it.

In reference to FIG. 4D, the process starts at box 452 when the mobile device launches a maps search box. In general, search boxes are types of input controls that give a user of a process the ability to provide some information in the form of a query. For example, a search box may be an editable text box or other user interface component.

In box 454, the mobile device receives an address input from the search box. In some implementations, a user may input an address into the search box (e.g., "HHH Metrodome" or "123 Main Street, Anytown, CA"). In other implementations, an automated process may automatically provide the address. For example, the map application may be configured with certain predefined addresses (e.g., the user's work, the user's home, or other addresses) which the map application can automatically provide to the mobile device upon request. As another example, a GPS module may determine the address of the mobile device according to a GPS calculation.

In box 456, the mobile device submits a formatted maps query. In general, the maps query can be formatted for any number of application program interfaces (API). Example formatting includes, but is not limited to, any number of database query formats, common gateway interface (CGI) request formats, hypertext markup language (HTML) formats, or any other conventional formats for submitting queries.

In box 458, the maps server receives the query and generates one or more results. For example, in some situations, the address may not be able to be resolved. That is, there may be more than one location with an address substantially similar to the one received from the mobile device. As such, in some implementations, the maps server may generate multiple results, one for each result, and may provide feedback to the mobile device (and the user) to help disambiguate the result (s). In other implementations, the maps server may first disambiguate the address before generating a result.

Once the maps server has determined a particular result, in box 460, the maps server transmits the relevant map tiles and other data to the mobile device. For example, the maps server may transmit map tiles and data associated with the HHH Metrodome (e.g., images, advertisements, or other data).

In box 462, the mobile device displays the map around the submitted address. For example, the mobile device can display buildings, streets, parks, or other aspects of the geography around the HHH Metrodome.

Once the map is displayed, in box 464, the mobile device may receive user input of a StreetView location and transmit location data. For example, the user can select a particular street displayed on the mobile device as the StreetView location. As another example, a GPS module may automatically provide the mobile device's current street as the StreetView location. The location data can be transmitted as a query. For example, the mobile device can format a query for one or more images associated with the StreetView location.

In box 466, the StreetView server receives the query and generates the results. In general, the StreetView server can access one or more image repositories and generate data that includes one or more images associated with the received query.

In box 468, the StreetView server transmits relevant real word camera images (perhaps with annotations). For example, in reference to FIG. 2B, the StreetView server transmits real world camera images of the HHH Metrodome with annotations for the particular street (e.g., "Kirby Puckett Pl") and the direction the street runs (e.g., represented by the "NE" and "SW" arrows). In some implementations, the image is comprised of multiple joined image files.

In box 470, the mobile device senses motion and updates the display to reflect that motion. For example, in response to a user shaking of the mobile device, the mobile device can move forward in the image space according to the amount of shaking detecting. As another example, in accordance with compass readings sensed by the mobile device, the image can be panned laterally around the geographic location. Other updates according to the reflected motion are also possible, some of which have been described above. In some implementations, the mobile device may request additional images if, for example, the mobile device does not contain any images that correspond to the sensed motion. For example, if the mobile device is panned laterally beyond a certain point, the mobile device may need to communicate with the StreetView server to receive additional images.

In box 472, the StreetView server generates and transmits additional image data as requested by the mobile device. In some implementations, the StreetView server may use previous queries to pre-fetch certain images from the image repositories in anticipation of additional motion sensed by the mobile device. That is, the StreetView server may determine additional images that may be used by the mobile device sometime in the future according to the current motion of the mobile device and transmit the additional image data with the current request. In general, boxes 470 and 472 and their respective communications may occur any number of times.

Figure 5:
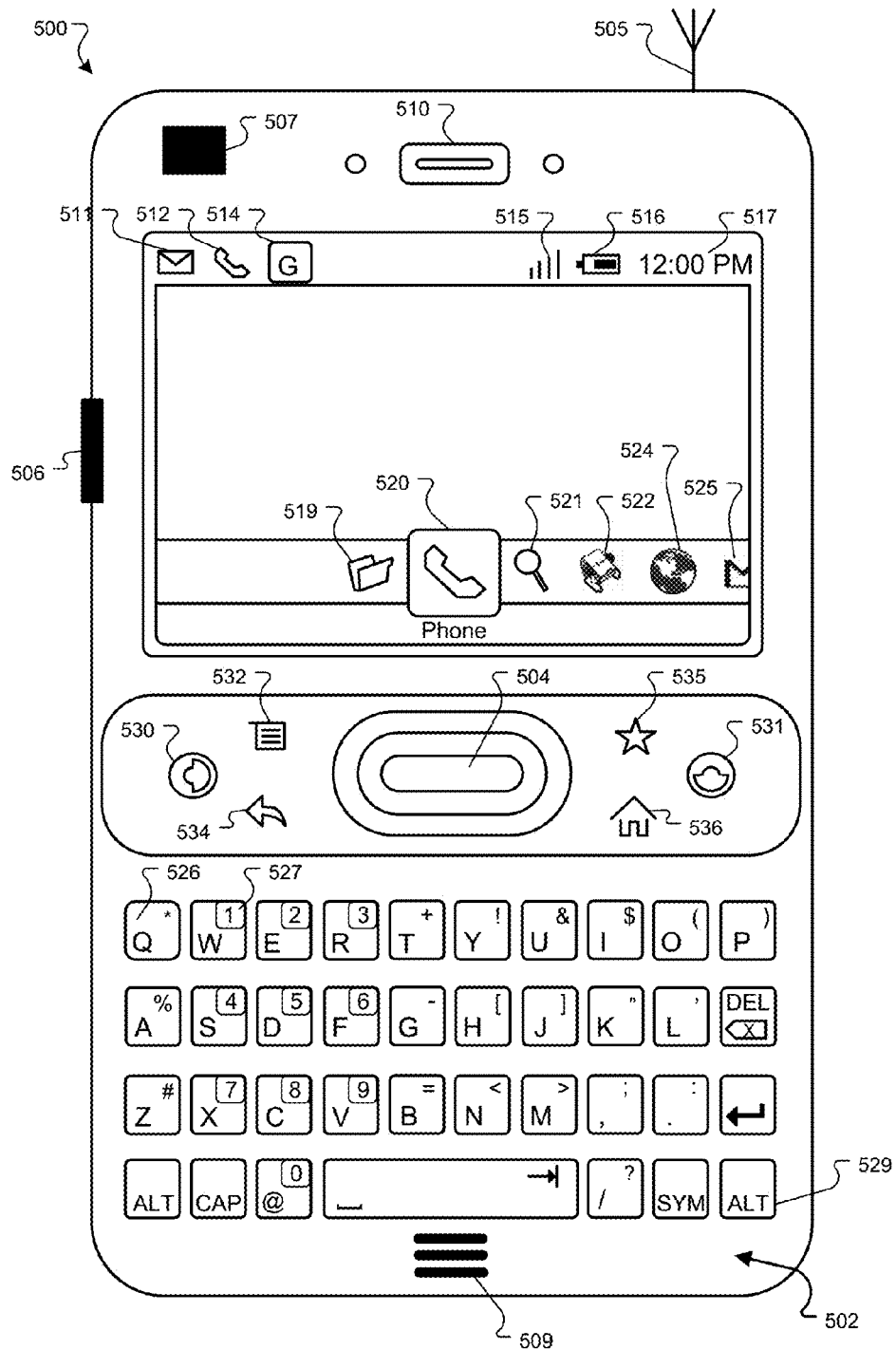
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
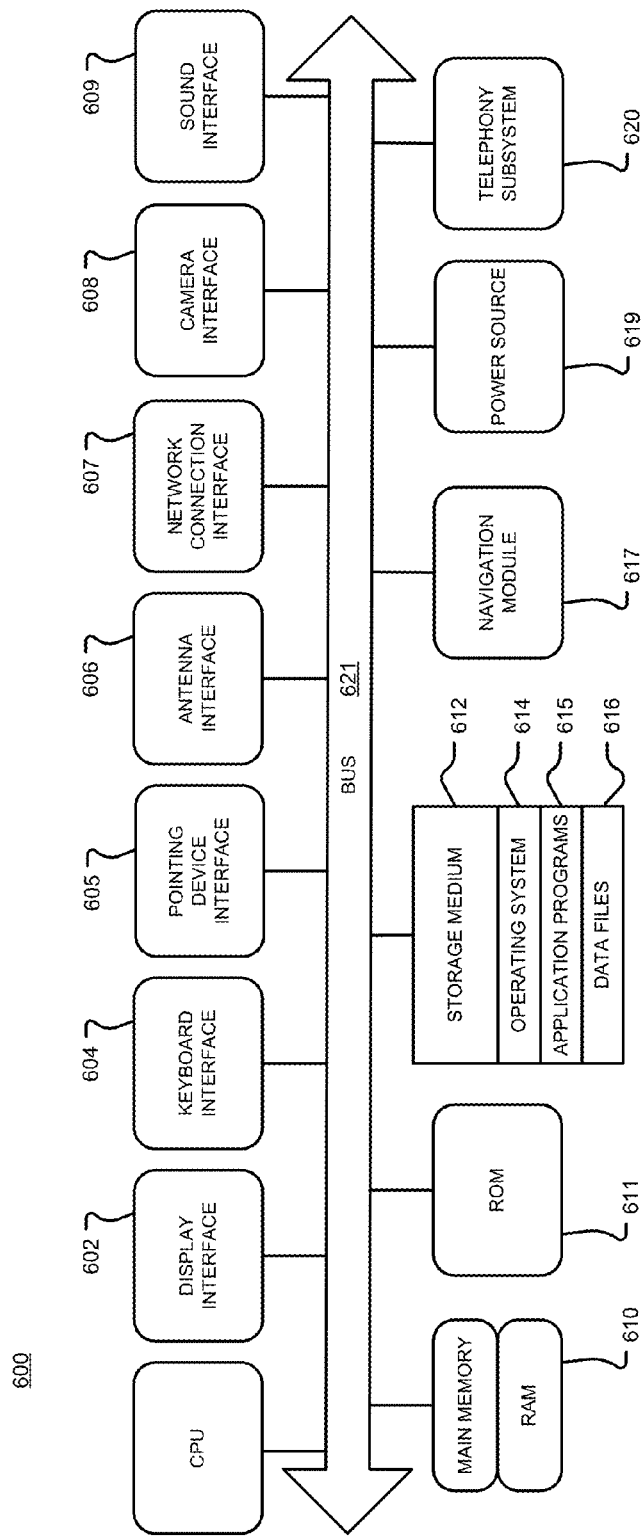
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
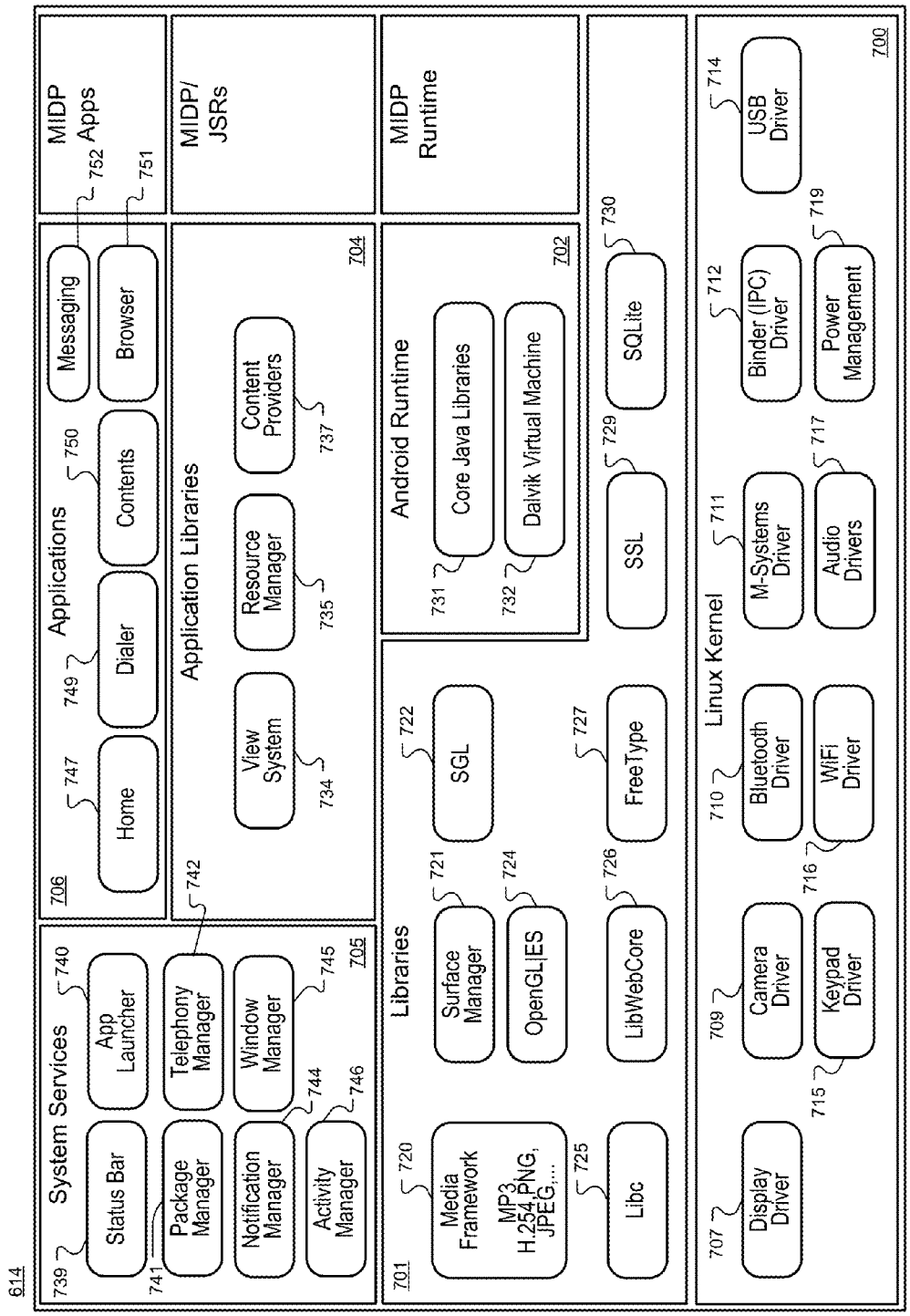
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and -dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
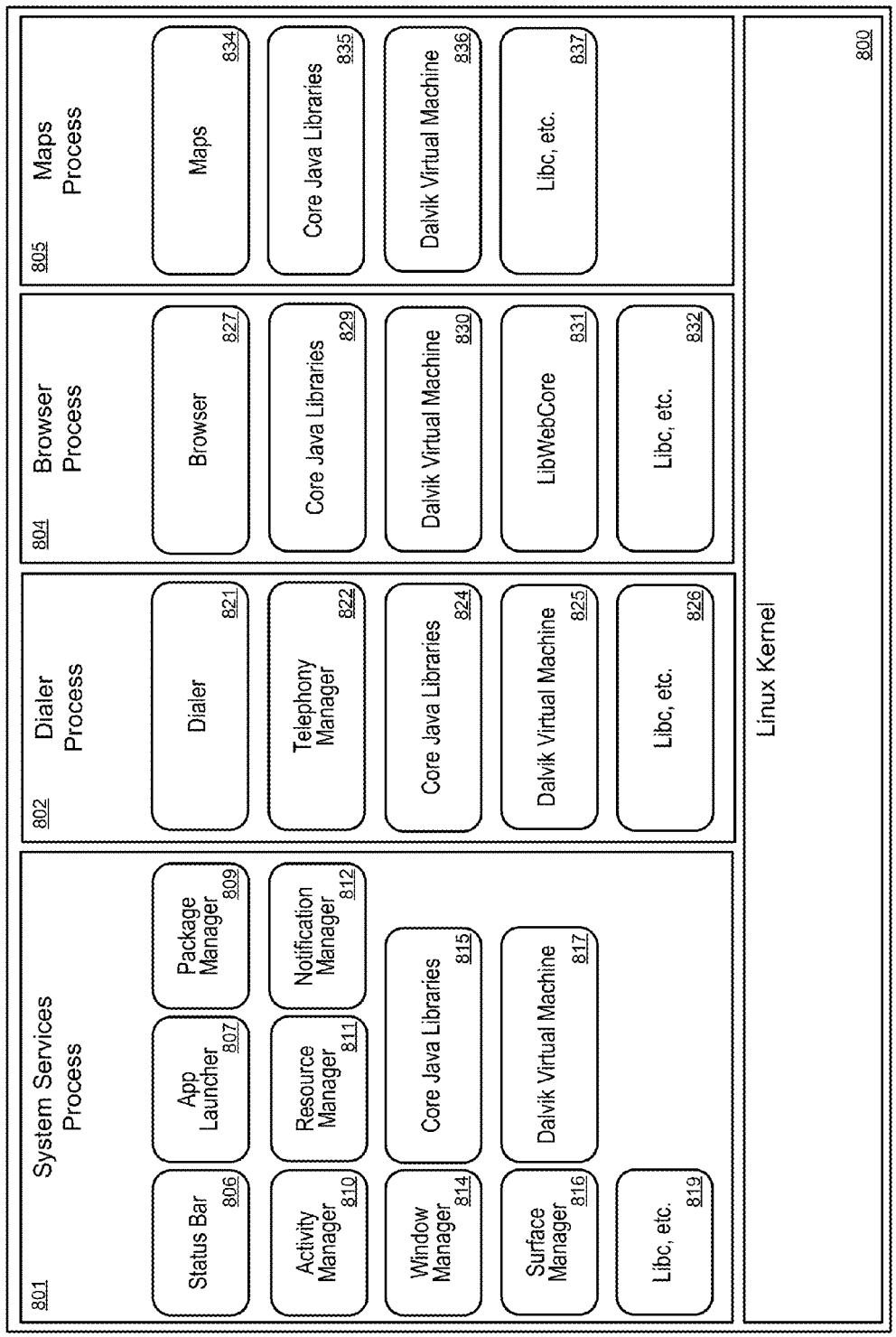
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
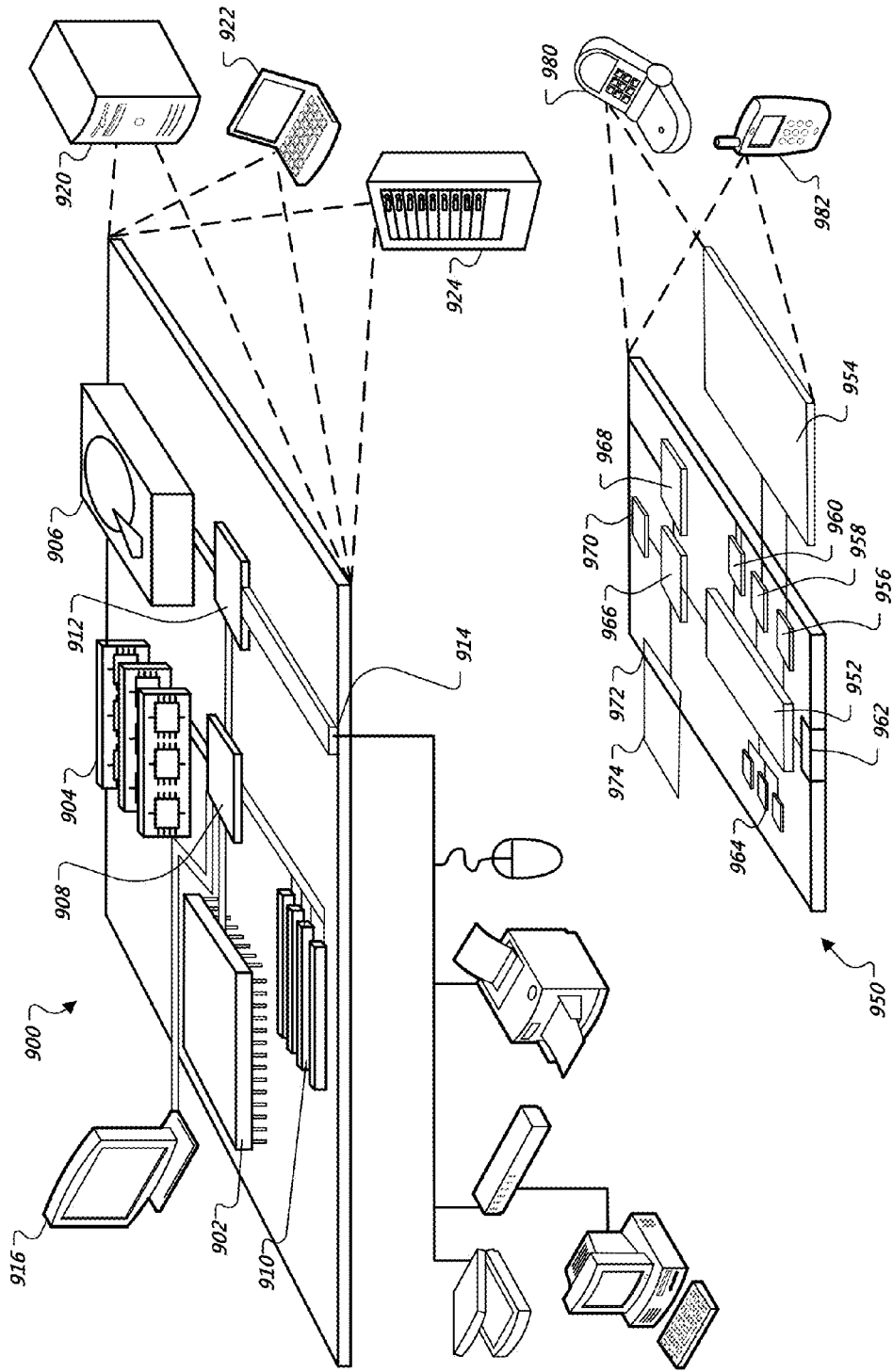
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Device 950 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 950 and used to update the display of the respective devices 950 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
    displaying, within a graphical interface on an electronic display of a computing device, a first portion of a list of grouped items, the list of grouped items including a plurality of different groups of items with the groups of items being arranged in a particular order;
    identifying, while continuing to display the first portion of the list of grouped items, that user input has selected to initiate scrolling of the list of grouped items within the graphical interface;
    in response to identifying that the user input has selected to initiate scrolling of the list of grouped items, causing a pop-up graphical element to be displayed within the graphical interface on the electronic display, the pop-up graphical element showing a first symbol that is representative of a first group of items, from among the plurality of different groups of items, based on the first group of items including at least one item displayed within the first portion of the list of grouped items;
    identifying that the user input has selected to scroll the list of grouped items from the first portion of the list of grouped items to a second portion of the list of grouped items; and
    in response to identifying that the user input has selected to scroll the list of grouped items from the first portion of the list of grouped items to the second portion of the list of grouped items, updating the pop-up graphical element by replacing the first symbol that is representative of the first group of items with a different, second symbol that is representative of a second group of items, from among the plurality of different groups of items, based on the second group of items including at least one item within the second portion of the list of grouped items.

2. The computer-implemented method of claim 1, wherein:
    the groups of items from the plurality of different groups of items respectively correspond to a plurality of different alphanumeric categories such that the respective items in each of the groups of items are assigned to a respective alphanumeric category corresponding to the group of items;
    the groups of items are ordered in the list of items according to the alphanumeric categories of the groups of items;
    the first symbol shown by the pop-up graphical element comprises a first alphanumeric symbol corresponding to the first group of items; and
    the second symbol shown by the pop-up graphical element comprises a second alphanumeric symbol corresponding to the second group of items, the second alphanumeric symbol being different than the first alphanumeric symbol.

3. The computer-implemented method of claim 1, further comprising in response to identifying that the user input has selected to scroll the list of grouped items from the first portion of the list of grouped items to the second portion of the list of grouped items, animating a display of the list of grouped items by scrolling from the first portion of the list of grouped items to the second portion of the list of grouped items in coordination with the user input.

4. The computer-implemented method of claim 1, further comprising maintaining the display of the first portion of the list of grouped items in a fixed position, while the pop-up graphical element is updated, as the user input is performed to scroll the list of grouped items from the first portion of the list of grouped items to the second portion of the list of grouped items.

5. The computer-implemented method of claim 1, wherein:
    the electronic display of the computing device is a touch-sensitive electronic display that is sensitive to user gestures performed on a surface of the touch-sensitive electronic display;
    identifying that the user input has selected to initiate scrolling of the list of grouped items comprises detecting that the surface of the touch-sensitive electronic display has been contacted at a first location of the graphical interface in which a scrolling control is located; and
    identifying that the user input has selected to scroll the list of grouped items from the first portion of the list of grouped items to the second portion of the list of grouped items comprises detecting that the user input has performed a swiping motion by a first non-zero distance across the touch-sensitive electronic display from the first location of the graphical interface to a second location of the graphical interface.

6. The computer-implemented method of claim 5, further comprising:
    after identifying that the user input has selected to scroll the list of grouped items from the first portion of the list of grouped items to the second portion of the list of grouped items, identifying that the user input has selected to continue scrolling the list of grouped items from the second portion of the list of grouped items to a third portion of the list of grouped items; and
    in response to identifying that the user input has selected to continue scrolling the list of grouped items from the second portion of the list of grouped items to the third portion of the list of grouped items, updating the pop-up graphical element by replacing the second symbol that is representative of the second group of items with a different, third symbol that is representative of a third group of items, from among the plurality of different groups of items, based on the third group of items including at least one item within the third portion of the list of grouped items,
    wherein identifying that the user input has selected to scroll the list of grouped items from the second portion of the list of grouped items to the third portion of the list of grouped items comprises detecting that the user input has continued to perform the swiping motion by swiping the first non-zero distance across the touch-sensitive electronic display from the second location of the graphical interface to a third location of the graphical interface.

7. The computer-implemented method of claim 6, further comprising:
    as a result of detecting that the user input has performed the swiping motion by the first non-zero distance across the touch-sensitive electronic display from the first location of the graphical interface to the second location of the graphical interface, scrolling the list of grouped items by a first number of groups of items that collectively consist of a second number of items; and as a result of detecting that the user input has continued to perform the swiping motion by swiping the first non-zero distance across the touch-sensitive electronic display from the second location of the graphical interface to the third location of the graphical interface, scrolling the list of grouped items by the first number of groups of items that collectively consist of a third number of items, wherein the second number of items is different than the third number of items.

8. The computer-implemented method of claim 6, further comprising:

as a result of detecting that the user input has performed the swiping motion by the first non-zero distance across the touch-sensitive electronic display from the first location of the graphical interface to the second location of the graphical interface, scrolling the list of grouped items by a first number of items in a second number of groups of items; and as a result of detecting that the user input has continued to perform the swiping motion by swiping the first non-zero distance across the touch-sensitive electronic display from the second location of the graphical interface to the third location of the graphical interface, scrolling the list of grouped items by the first number of items in a third number of groups of items, wherein the second number of groups of items is different than the third number of groups of items.

9. The computer-implemented method of claim 1, wherein identifying that the user input has selected to initiate scrolling of the list of grouped items within the graphical interface comprises identifying that the user input has selected a graphical scrolling control displayed within the graphical interface located along an edge of the electronic display.

10. The computer-implemented method of claim 9, further comprising changing a visual shape of the graphical scrolling control in coordination with the user input scrolling the list of grouped items from the first portion of the list of grouped items to the second portion of the list of grouped items.

11. One or more non-transitory computer-readable storage devices having instructions stored thereon that, when executed by one or more processors, cause performance of operations comprising:

displaying, within a graphical interface on an electronic display of a computing device, a first portion of a list of grouped items, the list of grouped items including a plurality of different groups of items with the groups of items being arranged in a particular order;

identifying, while continuing to display the first portion of the list of grouped items, that user input has selected to initiate scrolling of the list of grouped items within the graphical interface;

in response to identifying that the user input has selected to initiate scrolling of the list of grouped items, causing a pop-up graphical element to be displayed within the graphical interface on the electronic display, the pop-up graphical element showing a first symbol that is representative of a first group of items, from among the plurality of different groups of items, based on the first group of items including at least one item displayed within the first portion of the list of grouped items;

identifying that the user input has selected to scroll the list of grouped items from the first portion of the list of grouped items to a second portion of the list of grouped items; and in response to identifying that the user input has selected to scroll the list of grouped items from the first portion of the list of grouped items to the second portion of the list of grouped items, updating the pop-up graphical element by replacing the first symbol that is representative of the first group of items with a different, second symbol that is representative of a second group of items, from among the plurality of different groups of items, based on the second group of items including at least one item within the second portion of the list of grouped items.

12. The one or more non-transitory computer-readable storage devices of claim 11, wherein:

the groups of items from the plurality of different groups of items respectively correspond to a plurality of different alphanumeric categories such that the respective items in each of the groups of items are assigned to a respective alphanumeric category corresponding to the group of items;

the groups of items are ordered in the list of items according to the alphanumeric categories of the groups of items;

the first symbol shown by the pop-up graphical element comprises a first alphanumeric symbol corresponding to the first group of items; and the second symbol shown by the pop-up graphical element comprises a second alphanumeric symbol corresponding to the second group of items, the second alphanumeric symbol being different than the first alphanumeric symbol.

13. The one or more non-transitory computer-readable storage devices of claim 11, wherein the operations further comprise in response to identifying that the user input has selected to scroll the list of grouped items from the first portion of the list of grouped items to the second portion of the list of grouped items, animating a display of the list of grouped items by scrolling from the first portion of the list of grouped items to the second portion of the list of grouped items in coordination with the user input.

14. The one or more non-transitory computer-readable storage devices of claim 11, wherein the operations further comprise maintaining the display of the first portion of the list of grouped items in a fixed position, while the pop-up graphical element is updated, as the user input is performed to scroll the list of grouped items from the first portion of the list of grouped items to the second portion of the list of grouped items.

15. The one or more non-transitory computer-readable storage devices of claim 11, wherein:

the electronic display of the computing device is a touch-sensitive electronic display that is sensitive to user gestures performed on a surface of the touch-sensitive electronic display;

identifying that the user input has selected to initiate scrolling of the list of grouped items comprises detecting that the surface of the touch-sensitive electronic display has been contacted at a first location of the graphical interface in which a scrolling control is located; and identifying that the user input has selected to scroll the list of grouped items from the first portion of the list of grouped items to the second portion of the list of grouped items comprises detecting that the user input has performed a swiping motion by a first non-zero distance across the touch-sensitive electronic display from the first location of the graphical interface to a second location of the graphical interface.

16. The one or more non-transitory computer-readable storage devices of claim 15, wherein the operations further comprise:

after identifying that the user input has selected to scroll the list of grouped items from the first portion of the list of grouped items to the second portion of the list of grouped items, identifying that the user input has selected to continue scrolling the list of grouped items from the second portion of the list of grouped items to a third portion of the list of grouped items; and in response to identifying that the user input has selected to continue scrolling the list of grouped items from the second portion of the list of grouped items to the third portion of the list of grouped items, updating the pop-up graphical element by replacing the second symbol that is representative of the second group of items with a different, third symbol that is representative of a third group of items, from among the plurality of different groups of items, based on the third group of items including at least one item within the third portion of the list of grouped items, wherein identifying that the user input has selected to scroll the list of grouped items from the second portion of the list of grouped items to the third portion of the list of grouped items comprises detecting that the user input has continued to perform the swiping motion by swiping the first non-zero distance across the touch-sensitive electronic display from the second location of the graphical interface to a third location of the graphical interface.

17. The one or more non-transitory computer-readable storage devices of claim 16, wherein the operations further comprise:

as a result of detecting that the user input has performed the swiping motion by the first non-zero distance across the touch-sensitive electronic display from the first location of the graphical interface to the second location of the graphical interface, scrolling the list of grouped items by a first number of groups of items that collectively consist of a second number of items; and as a result of detecting that the user input has continued to perform the swiping motion by swiping the first non-zero distance across the touch-sensitive electronic display from the second location of the graphical interface to the third location of the graphical interface, scrolling the list of grouped items by the first number of groups of items that collectively consist of a third number of items, wherein the second number of items is different than the third number of items.

18. The one or more non-transitory computer-readable storage devices of claim 16, wherein the operations further comprise:

as a result of detecting that the user input has performed the swiping motion by the first non-zero distance across the touch-sensitive electronic display from the first location of the graphical interface to the second location of the graphical interface, scrolling the list of grouped items by a first number of items in a second number of groups of items; and as a result of detecting that the user input has continued to perform the swiping motion by swiping the first non-zero distance across the touch-sensitive electronic display from the second location of the graphical interface to the third location of the graphical interface, scrolling the list of grouped items by the first number of items in a third number of groups of items, wherein the second number of groups of items is different than the third number of groups of items.

19. The one or more non-transitory computer-readable storage devices of claim 11, wherein identifying that the user input has selected to initiate scrolling of the list of grouped items within the graphical interface comprises identifying that the user input has selected a graphical scrolling control displayed within the graphical interface located along an edge of the electronic display.

20. The one or more non-transitory computer-readable storage devices of claim 19, wherein the operations further comprise changing a visual shape of the graphical scrolling control in coordination with the user input scrolling the list of grouped items from the first portion of the list of grouped items to the second portion of the list of grouped items.

\* \* \* \* \*